United States Patent
Rey et al.

(10) Patent No.: US 8,940,667 B2
(45) Date of Patent: Jan. 27, 2015

(54) FLUID TREATMENT SYSTEMS, COMPOSITIONS AND METHODS FOR METAL ION STABILIZATION IN AQUEOUS SOLUTIONS AND/OR ENHANCED FLUID PERFORMANCE

(75) Inventors: Paul Rey, Coraopolis, PA (US); Susan Rey, Coraopolis, PA (US); Michael John Seyman, Warren, OH (US); Matthew E. Blauch, Duncan, OK (US)

(73) Assignees: Kroff Chemical Company, Pittsburgh, PA (US); Nabors Completion & Production Services Co., Houston, TX (US)

( * ) Notice: Subject to any disclaimer, the term of this patent is extended or adjusted under 35 U.S.C. 154(b) by 290 days.

(21) Appl. No.: 12/794,495

(22) Filed: Jun. 4, 2010

(65) Prior Publication Data

US 2010/0311618 A1 Dec. 9, 2010

Related U.S. Application Data

(60) Provisional application No. 61/184,471, filed on Jun. 5, 2009.

(51) Int. Cl.
*C09K 8/588* (2006.01)
*C09K 8/52* (2006.01)
(Continued)

(52) U.S. Cl.
CPC ... *C09K 8/68* (2013.01); *C09K 8/74* (2013.01); *C09K 8/88* (2013.01); *C09K 8/90* (2013.01); *C09K 2208/28* (2013.01);
(Continued)

(58) Field of Classification Search
USPC .......... 507/90, 117, 119, 120, 121, 133, 224, 507/225, 226, 246, 927, 932, 940; 166/305.1

See application file for complete search history.

(56) References Cited

U.S. PATENT DOCUMENTS 3,102,548 A 9/1963 Smith
3,182,018 A * 5/1965 Chittum et al. ............... 507/271
(Continued)

OTHER PUBLICATIONS

Practical Handbook of Marine Science, third edition, CRC Press 2001, Kennish.*

(Continued)

*Primary Examiner* — Aiqun Li
(74) *Attorney, Agent, or Firm* — The Webb Law Firm

(57) ABSTRACT

Fluid treatment systems and compositions are provided including (a) at least one material including (1) at least one carboxylic acid functional group and (2) at least one sulfur-containing group selected from the group consisting of sulfonyl functional groups, sulfonate functional groups and mixtures thereof; (b) at least one friction reducing agent selected from the group consisting of guar gums, polyacrylamides, hydratable cellulosic materials, viscoelastic surfactants, and mixtures thereof; and (c) at least one scale control agent. The fluid treatment systems and compositions can be used to treat aqueous systems, for example as fracturing fluids for treating aqueous compositions found in subterranean formations. Methods for inhibiting formation and/or precipitation of metal oxides in an aqueous composition using the fluid treatment systems or compositions also are provided.

54 Claims, 1 Drawing Sheet

(51) Int. Cl.
| | |
|---|---|
| C09K 8/24 | (2006.01) |
| C09K 8/36 | (2006.01) |
| C09K 8/02 | (2006.01) |
| C09K 8/528 | (2006.01) |
| C09K 8/584 | (2006.01) |
| E21B 43/26 | (2006.01) |
| C09K 8/68 | (2006.01) |
| C09K 8/74 | (2006.01) |
| C09K 8/88 | (2006.01) |
| C09K 8/90 | (2006.01) |

(52) U.S. Cl.
CPC .......... Y10S 507/922 (2013.01); Y10S 507/927 (2013.01); Y10S 507/932 (2013.01)
USPC ............. 507/225; 507/90; 507/117; 507/119; 507/120; 507/121; 507/133; 507/224; 507/226; 507/246; 507/927; 507/932; 507/946; 166/305.1; 166/308.1; 507/922

(56) References Cited

U.S. PATENT DOCUMENTS

| | | | |
|---|---|---|---|
| 3,837,803 | A | 9/1974 | Carter et al. |
| 3,928,196 | A | 12/1975 | Persinski et al. |
| 4,288,327 | A | 9/1981 | Godlewski et al. |
| 4,361,492 | A | 11/1982 | Dubin |
| 4,560,481 | A | 12/1985 | Hollander |
| 4,618,448 | A | 10/1986 | Cha et al. |
| 4,634,532 | A | 1/1987 | Logan et al. |
| 4,640,793 | A | 2/1987 | Persinski et al. |
| 4,671,888 | A | 6/1987 | Yorke |
| 4,699,225 | A * | 10/1987 | Bardoliwalla ................ 175/72 |
| 4,711,725 | A | 12/1987 | Amick et al. |
| 4,741,400 | A * | 5/1988 | Underdown ................ 166/279 |
| 4,783,267 | A | 11/1988 | Boffardi et al. |
| 4,790,958 | A | 12/1988 | Teot |
| 4,801,387 | A | 1/1989 | Chen |
| 4,801,388 | A | 1/1989 | Fong et al. |
| 4,869,845 | A | 9/1989 | Chen |
| 4,892,898 | A | 1/1990 | Leighton et al. |
| 4,895,663 | A | 1/1990 | Chen |
| 4,895,664 | A | 1/1990 | Chen |
| 4,944,885 | A | 7/1990 | Chen |
| 4,952,327 | A | 8/1990 | Amjad et al. |
| 5,027,843 | A | 7/1991 | Grabois et al. |
| 5,224,543 | A | 7/1993 | Watkins et al. |
| 5,258,137 | A | 11/1993 | Bonekamp et al. |
| 5,262,061 | A | 11/1993 | Gill et al. |
| 5,282,976 | A | 2/1994 | Yeung |
| 5,551,516 | A | 9/1996 | Norman et al. |
| 5,627,145 | A * | 5/1997 | Thevissen .................. 507/224 |
| 5,964,295 | A | 10/1999 | Brown et al. |
| 5,979,557 | A | 11/1999 | Card et al. |
| 6,140,277 | A | 10/2000 | Tibbles et al. |
| 6,306,800 | B1 | 10/2001 | Samuel et al. |
| 6,412,561 | B1 | 7/2002 | Brown et al. |
| 6,435,277 | B1 * | 8/2002 | Qu et al. ................ 166/281 |
| 6,446,727 | B1 | 9/2002 | Zemlak et al. |
| 6,508,307 | B1 | 1/2003 | Almaguer |
| 7,115,201 | B2 | 10/2006 | Rey |
| 7,196,041 | B2 | 3/2007 | Jones et al. |
| 7,311,146 | B1 * | 12/2007 | Hanes et al. ................ 166/279 |
| 7,343,978 | B2 | 3/2008 | Jones et al. |
| 7,482,310 | B1 | 1/2009 | Reese et al. |
| 7,531,600 | B1 | 5/2009 | Rey |
| 7,786,054 | B2 | 8/2010 | Starkey, II et al. |
| 7,906,463 | B2 | 3/2011 | Starkey, II et al. |
| 2006/0272816 | A1 * | 12/2006 | Willberg et al. ................ 166/279 |
| 2008/0248976 | A1 | 10/2008 | Knox |
| 2009/0277641 | A1 | 11/2009 | Walters et al. |
| 2010/0125044 | A1 | 5/2010 | Keister |
| 2010/0200239 | A1 | 8/2010 | Aften |

OTHER PUBLICATIONS

Susan P. Rey, "Carbon Steel Corrosion Control in the Past Twenty Years and in the New Millennium," AWT Conference 2000.

Leonard Kalfayan, "Production Enhancement with Acid Stimulation," Chapter 2, 2nd Edition, Mar. 2008.

Karen Bybee, "Continuous Improvements in Acid Fracturing at Lake Maracaibo," Journal of Petroleum Technology, Jul. 2006, pp. 54-56.

H.A. Nasr-El-Din et al., "Acid Fracturing of Gas Wells Using an Acid Precursor in the Form of Solid Beads: Lessons Learned From First Field Application," SPE 110895, prepared for presentation at the 2007 SPE Annual Technical Conference and Exhibition held in Anaheim, California, U.S.A., Nov. 11-14, 2007.

Jeffrey R. Leitzell, "Viscoelastic Viscoelastic Surfactants: A New Horizon in Fracturing Fluids for Pennsylvania," SPE 111182, prepared for presentation at the 2007 SPE Eastern Regional Meeting held in Lexington, Kentucky, U.S.A., Oct. 17-19, 2007.

Matthew Samuel et al., "Viscoelastic Surfactant Fracturing Fluids: Applications in Low Permeability Reservoirs," SPE 60322, prepared for presentation at the 2000 SPE Rocky Mountain Regional/Low Permeability Reservoirs Symposium and Exhibition held in Denver, Colorado, Mar. 12-15, 2000.

Brett Rimmer et al., "Fracture Geometry Optimization: Designs Utilizing New Polymer-Free Fracturing Fluid and Log-Derived Stress Profile/Rock Properties," SPE 58761, prepared for presentation at the 2000 SPE International symposium on formation Damage Control held in Lafayette, Louisiana, Feb. 23-24, 2000.

"Noverite K-798 Polymer," product specification published by Lubrizol Corp., Feb. 2008.

"Carbosperse K-798 Acrylate Terpolymer," technical data sheet published by Lubrizol Corp., Jun. 2007.

"ClearFRAC LT Surfactant," brochure published by Shlumberger Marketing Communications, Apr. 2005.

"Acumer 3100 Iron Oxide Dispersant," information sheet published by Rohm and Haas, Jan. 2002.

"Acrylic Acid-2-Acrylamido-2-Methylpropane Sulfonic Acid Copolymer (AA/AMPS)," Thwater, http://www.watertreatmentchemical.us/03-AA-AMPS.htm., Copyright 2003-2007 Shandong Taihe Water Treatment Co., Ltd.

"Aquatreat AR-540 Unique Calcium Phosphate Inhibitor," product guide published by Alcochemical, 2001.

M. Samuel et al., "Polymer-Free Fluid for Hydraulic Fracturing", SPE 38622 (1997).

Gidley et al., Recent Advances in Hydraulic Fracturing, Chapter 6, "Propping Agents and Fracture Conductivity", SPE, 109-130 (1989).

"GammaFRacTM Breakthrough slick water fluid for shale fracturing", Superior Well Services Inc. (Copyright 2009; first published Feb. 16, 2010).

"Remediation: Gamma Frac System by Superior Well Services", http//www.epmag.com/article/print/58556 (May 1, 2010).

"World Oil Winners Announced: Eleven Winning Companies Receive Top Honors at Global Petroleum Event", World Oil, Gulf Publishing Company, (Oct. 16, 2009), http://www.worldoil.com/press-detail.aspx?PressContentID=65242.

N. Houston et al., "Fracture-Stimulation in the Marcellus Shale-Lessons Learned in Fluid Selection and Execution", Society of Petroleum Engineers, SPE 125987, (Sep. 23-25, 2009).

M.E. Blauch et al., "Marcellus Shale Post-Frac Flowback Waters—Where is All the Salt Coming From and What are the Implications?", Society of Petroleum Engineers, SPE 125740, (Sep. 23-25, 2009.).

* cited by examiner

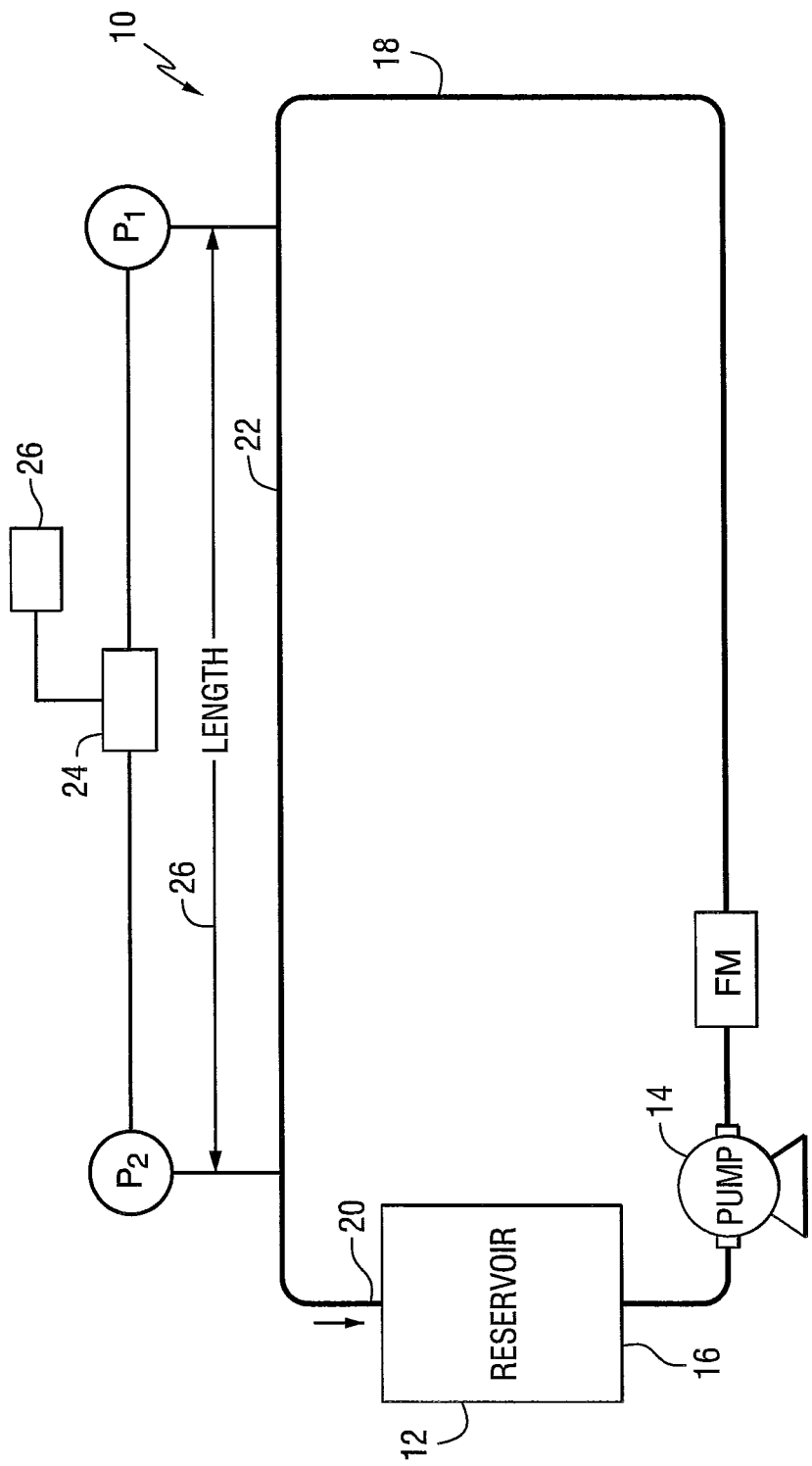

FLUID TREATMENT SYSTEMS, COMPOSITIONS AND METHODS FOR METAL ION STABILIZATION IN AQUEOUS SOLUTIONS AND/OR ENHANCED FLUID PERFORMANCE

CROSS-REFERENCE TO RELATED APPLICATION

This application claims the benefit of U.S. Provisional Patent Application No. 61/184,471, filed on Jun. 5, 2009, which is incorporated by reference herein.

BACKGROUND OF THE INVENTION

I. Field of the Invention

The present invention relates to fluid treatment systems and compositions comprising carboxylic acid functional and sulfonyl and/or sulfonate functional polymer(s), friction reducing agent(s) and scale control agent(s), and methods using such fluid treatment systems and compositions for stabilizing metal ions in aqueous compositions, such as hydraulic fracturing compositions, and/or enhancing fluid performance.

II. Technical Considerations

The presence of iron provides a significant and complex problem in well stimulation operations. Iron in the ferric state can form iron complexes that can block flow pathways and inhibit the flow of gas and/or oil therethrough. Also, iron can impair the performance of fracturing fluid components, such as the friction reducing additive.

In oil and gas wells, air can be introduced into water present in the underground formation through the borehole or from comingling of underground water with air-saturated water which has been pumped from the surface into the well. Ground or well water typically exists in a reducing environment. As a result, iron in ground or well water typically is present as the ferrous ion ($Fe^{+2}$) species. The ferrous iron can originate from many sources, such as the minerals contained within stratigraphic formations surrounding the water or from additives added to the water during oil or gas well drilling or fracturing operations. Exposure to air (oxygen) or other oxidants (chlorine, bromine, stabilized bromine, etc.) causes ferrous ions to be oxidized to insoluble ferric ($Fe^{+3}$) ion complexes. Ferric ion complexes, such as hydrated ferric oxides ($Fe_2O_3.nH_2O$), are much less soluble than ferrous iron, and once formed can readily precipitate. The accumulation of these solids can block pores and flow pathways (or fracture conductivity) in the oil or gas well formation, thus causing permeability impairment with an associated decline in oil or gas flow. While not intending to be bound by any theory, it is believed that when iron is present in soluble or dispersed form, it is less likely to block the flow pathways, thus enhancing production potential of the well.

The formation or precipitation of iron oxides can be inhibited by stabilization of the ferrous ion, and/or suspension or dispersion of the iron oxide(s). Stabilization is the process by which polymers: (1) form stable complexes with dissolved iron, thus preventing the formation of insoluble $Fe_2O_3.nH_2O$ and (2) absorb onto the surface of particulates that are forming, thereby greatly restricting particle growth and thus allowing the particles to remain suspended. In contrast, dispersion is the process by which pre-formed iron oxide ($Fe_2O_3$) particles are prevented from settling by the action of a polymer. Dispersants are generally negatively charged, low molecular weight polymers. Likewise, the surface charge of iron oxide particles is negative. The repulsion between the negatively charged particle surface and negatively charged polymers prevents the particles from agglomerating and settling.

To prevent clogging of the flow pathways in oil and gas well formations, chelating agents have been used. Citric acid, ethylenediaminetetraacetic acid (EDTA) and nitriloacetic acid (NTA) are common iron chelating agents used for iron control in fracturing fluid design. Chelating agents function on a stoichiometric basis, i.e., one mole of chelating agent is needed per mole of iron. Additional chelating agent is needed to drive the reaction, with the dose depending on the conditional stability constant (K=[complex]/[metal][chelating agent], K being a function of pH). Thus, high doses of chelating agent are needed. The large dose requirement of citric acid results in pH depression, which in turn can negatively impact some friction reducing additives, such as polyacrylamide-based products. While sulfonated polymers have been used to disperse pre-formed ferric iron particulates and/or to stabilize low levels (≤10 mg/L) of ferrous ions in cooling water applications, they have not been used in oil and gas well water to stabilize the high levels of ferrous ions and/or ferric oxide particulates which can exceed 20 mg/L.

In another aspect of the stimulation process, during the hydraulic fracturing operation fluid is pumped at high velocity and high pressure drops are encountered, resulting in large energy losses. Pressures at the surface of the well of 3,000 to 15,000 psi are often required to overcome the frictional losses and fracture initiation pressure. It is well known that energy is lost due to frictional forces encountered during the movement of liquid through a pipe, tubing or conduit. The energy loss is reflected in a progressive drop in pressure measured along the path between the inlet and discharge point. Factors such as fluid velocity, pipe diameter, pipe length, interior surface roughness, fluid density, and fluid viscosity impact the pressure drop, also known as differential pressure.

Well-known laws of fluid dynamics correlate pressure drop as being proportional to fluid velocity. The Reynolds' number (Re) is a dimensionless number that gives a measure of the ratio of inertial forces ($\rho V^2 L^2$) to viscous forces ($\mu VL$), and is used to describe different flow regimes, such as laminar or turbulent flow: laminar flow occurs at low Reynolds numbers, where viscous forces are dominant, and is characterized by smooth, constant fluid motion, while turbulent flow occurs at high Reynolds numbers and is dominated by inertial forces, which tend to produce random eddies, vortices and other flow instabilities. As fluid velocity increases, the conditions change from laminar to transitional to turbulent flow. Under laminar conditions flow is smooth and energy loss is minimal, while under turbulent conditions random impurities and other flow instabilities contribute to greater energy loss. Generally, turbulent flow exists when the Reynolds' number of a fluid is >5,000. For the most part, hydraulic fracturing operations occur in the turbulent flow regime. Therefore, reducing energy loss results in significant economic and safety incentives based on lower operating pressures, less equipment fatigue, lower horsepower demand and less capital for equipment.

It is well known that small amounts of high molecular weight polymers can be very effective in reducing friction loss of flowing aqueous fluids. Slickwater applications have been effectively applied in the hydraulic fracturing of Barnett Shale and other unconventional gas shale applications. Certain metal ions, such as ferrous iron, are known to degrade polyacrylamide polymers. The exact mechanism for this degradation is not completely understood but is thought to proceed by a free radical mechanism. Since oxygen is known to accelerate degradation, it seems plausible that an oxygen-anion radical is formed when a metal ion is oxidized. The highly reactive oxygen-anion radical then can attack the polymer chain, scission the polymer backbone and result in performance deterioration.

Also, carbonate and sulfate ions can be present in flowback water from fracturing operations. The fracturing fluid in the down-hole environment can release soluble salts from the formation that can combine with the fracturing fluid and form precipitates such as calcium carbonate, calcium sulfate, barium sulfate, strontium sulfate, and iron carbonate within the underground fracture network and cause scale accumulation in perforations or fissures in the fractured rock There is a long-felt need in the art for alternative metal ion stabilizers that can be used to control high levels of ferrous ions and/or ferric oxide particulates which can exceed 20 mg/L in aqueous solutions, such as are typically found in hydraulic fracturing applications, and which are compatible with or provide enhanced performance of friction reducing agents and the resulting friction reducing fluid comprised of the friction reducing agents and other fluid additives. A metal ion stabilizer or a metal precipitant dispersant that would mitigate the adverse impact of metal ions, such as ferrous iron, on the friction reduction additive would be of significant advantage to the well drilling industry.

SUMMARY OF THE INVENTION

In some non-limiting embodiments, fluid treatment systems and compositions are provided comprising: (a) at least one material comprising (1) at least one carboxylic acid functional group and (2) at least one sulfur-containing group selected from the group consisting of sulfonyl functional groups, sulfonate functional groups, and mixtures thereof; (b) at least one friction reducing agent selected from the group consisting of guar gums, polyacrylamides, hydratable cellulosic materials, viscoelastic surfactants, and mixtures thereof; and (c) at least one scale control agent.

In some non-limiting embodiments, aqueous compositions or fracturing fluids are provided comprising metal ions, such as ferrous ions, and the above fluid treatment system or composition.

In some non-limiting embodiments, aqueous compositions or fracturing fluids are provided comprising at least one acid and the above fluid treatment system or composition. Such acid treatments can be used for acid fracturing treatments or combined to use in part or stages within a near-neutral pH fracturing fluid system.

In some non-limiting embodiments, methods of inhibiting formation of metal oxides in an aqueous composition comprising metal ions are provided which comprise: mixing an aqueous composition comprising metal ions with the above fluid treatment system or composition.

In some non-limiting embodiments, methods of inhibiting precipitation of metal oxides in an aqueous composition comprising metal ions are provided which comprise: mixing an aqueous composition comprising metal ions with the above fluid treatment system or composition.

In some non-limiting embodiments, methods of treating a subterranean formation penetrated by a well bore are provided which comprise: contacting the subterranean formation with the above fracturing fluid.

In some non-limiting embodiments, methods of inhibiting formation of metal oxides in an aqueous composition comprising at least 20 milligrams of metal ions per liter of aqueous composition are provided which comprise: mixing an aqueous composition comprising metal ions with the above fluid treatment system or composition.

In some non-limiting embodiments, methods of inhibiting precipitation of metal oxides in an aqueous composition comprising at least 20 milligrams of metal ions per liter of aqueous composition, comprising: mixing an aqueous composition comprising metal ions with the above fluid treatment system or composition.

BRIEF DESCRIPTION OF THE DRAWING

The foregoing summary, as well as the following detailed description, will be better understood when read in conjunction with the appended drawing. In the drawing:

FIG. 1 is a schematic drawing of a closed loop test apparatus for evaluating friction reduction of water systems.

DETAILED DESCRIPTION

For the purposes of this specification, unless otherwise indicated, all numbers expressing quantities of ingredients, reaction conditions, dimensions, physical characteristics, and so forth, used in the specification and claims are to be understood as being modified in all instances by the term "about". Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical values, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include any and all sub-ranges between and including the recited minimum value of 1 and the recited maximum value of 10, that is, all sub-ranges beginning with a minimum value equal to or greater than 1 and ending with a maximum value equal to or less than 10, and all sub-ranges in between, e.g., 1 to 6.3, or 5.5 to 10, or 2.7 to 6.1.

As used herein, the term "substantially free" is meant to indicate that a material is present as an incidental impurity. In other words, the material is not intentionally added to an indicated composition, but may be present at minor or inconsequential levels because it was carried over as an impurity as part of an intended composition component.

It should also be noted that any carbon, as well as heteroatom, with unsatisfied valences in the text, schemes, examples and Table herein is assumed to have the sufficient number of hydrogen atom(s) to satisfy the valences.

When any variable (e.g., alkyl, heterocycle, $R^2$, etc.) occurs more than one time in any constituent, its definition on each occurrence is independent of its definition at every other occurrence.

As used herein, the term "composition" is intended to encompass a product comprising the specified ingredients in the specified amounts, as well as any product which results, directly or indirectly, from the combination of the specified ingredients in the specified amounts.

As used herein, "formed from" or "prepared from" denotes open, e.g., "comprising," claim language. As such, it is intended that a composition "formed from" or "prepared from" a list of recited components be a composition comprising at least these recited components or the reaction product of at least these recited components, and can further comprise other, non-recited components, during the composition's formation or preparation.

As used herein, the phrase "reaction product of" means chemical reaction product(s) of the recited components, and can include partial reaction products as well as fully reacted products.

As used herein, the term "polymer" means a substance, typically of large molecular mass, comprising structural units or monomers. Examples of polymers include oligomers, homopolymers and copolymers. The term "oligomer" means a polymer consisting of only a few monomer units up to about ten monomer units, for example a dimer, trimer or tetramer.

The compositions and methods of the present invention can be useful in a wide variety of applications, non-limiting examples of which include stabilization of metal ions in aqueous systems, as well as in petroleum and gas field well drilling or fracturing operations.

In some non-limiting embodiments, the fluid treatment systems and compositions of the present invention comprise: (a) at least one material comprising (1) at least one carboxylic acid functional group and (2) at least one sulfur-containing group selected from the group consisting of sulfonyl functional groups, sulfonate functional groups, and mixtures thereof; (b) at least one friction reducing agent selected from the group consisting of guar gums, polyacrylamides, hydratable cellulosic materials, viscoelastic surfactants, and mixtures thereof; and (c) at least one scale control agent.

In some non-limiting embodiments, the fluid treatment systems and compositions of the present invention consist essentially of or consist of: the at least one material (a) as described above; the at least one friction reducing agent (b) as described above; and the at least one scale control agent (c) as described above.

In some non-limiting embodiments, the at least one material (a) is a reaction product or salt thereof, wherein the reaction product is prepared from reactants comprising: at least one ethylenically unsaturated, carboxylic acid functional material or anhydride thereof; and at least one ethylenically unsaturated, sulfur-containing material, wherein the ethylenically unsaturated sulfur-containing material comprises at least one sulfur-containing group selected from the group consisting of sulfonyl functional groups, sulfonate functional groups and mixtures thereof (includes at least one sulfonyl functional group and at least one sulfonate functional group).

In some non-limiting embodiments, suitable ethylenically unsaturated, carboxylic acid functional materials or anhydrides thereof for preparing the reaction product in the fluid treatment systems, compositions and methods of the present invention include those having acrylic or vinyl functionality. Non-limiting examples of suitable ethylenically unsaturated, carboxylic acid functional materials include those selected from the group consisting of acrylic acid, methacrylic acid, α-halo acrylic acid, maleic acid, itaconic acid, vinyl acetic acid, allyl acetic acid, fumaric acid, β-carboxyethyl acrylic acid, salts thereof, and mixtures thereof. A non-limiting example of a suitable ethylenically unsaturated, carboxylic acid functional anhydride is maleic anhydride.

In some non-limiting embodiments, the at least one ethylenically unsaturated, carboxylic acid functional material or anhydride thereof comprises about 10 to about 90 weight percent of the reactants, or about 20 to about 80 weight percent, or about 30 to about 70 weight percent, on a basis of total weight of the reactants.

In some non-limiting embodiments, suitable ethylenically unsaturated, sulfur-containing materials for preparing the reaction product in the fluid treatment systems, compositions and methods of the present invention include those having vinyl functionality, acrylic functionality, acrylamido functionality, acrylamido alkyl functionality and/or acrylamido aryl functionality. Non-limiting examples of suitable ethylenically unsaturated, sulfur-containing materials include those selected from the group consisting of 2-acrylamido-2-methylpropyl sulfonic acid; allyl-2-hydroxypropyl sulfonic acid ether; allyl-2-hydroxypropyl sulfonate ether; sulfomethylacrylamide; 2-propene-1-sulfonic acid, 2-methyl; 2-methacrylamido-2-methylpropyl sulfonic acid; styrene sulfonic acid; vinyl sulfonic acid; sulfoalkyl acrylate; sulfoalkyl methacrylate; sulfoalkyl acrylamide; allyl sulfonic acid; methallyl sulfonic acid; para methallyloxy benzene sulfonic acid; allyl-2-hydroxypropyl sulfonic acid; 3-methacrylamido-2-hydroxypropyl sulfonic acid; sulfonic acid acrylate; sulfonated phenolmethacrylic ether; salts thereof and mixtures thereof.

In some non-limiting embodiments, the at least one ethylenically unsaturated, sulfur-containing material comprises about 5 to about 95 weight percent of the reactants, or about 10 to about 90 weight percent of the reactants, or about 20 to about 80 weight percent, or about 30 to about 70 weight percent, on a basis of total weight of the reactants.

In some non-limiting embodiments, the weight ratio of ethylenically unsaturated, carboxylic acid functional material or anhydride thereof to ethylenically unsaturated, sulfur-containing material ranges from about 1:20 to about 20:1, or about 1:10 to about 10:1, or about 1:5 to about 5:1.

In some non-limiting embodiments, the reaction product or salt thereof useful as material (a) has a weight average molecular weight ranging from about 500 to about 1,000,000 grams per mole, or about 1,000 to about 100,000 grams per mole, or about 2,000 to about 30,000 grams per mole.

In some non-limiting embodiments, the reaction product useful as material (a) can be prepared from acrylic acid (AA) and 2-acrylamido-2-methylpropyl sulfonic acid (AMPS), for example about 25 to about 95 mole percent of acrylic acid and about 5 to about 75 mole percent of 2-acrylamido-2-methylpropyl sulfonic acid. Non-limiting examples of suitable AA/AMPS copolymers include KR-DP0184 copolymer prepared from about 60 weight percent AA and about 40 weight percent AMPS, which is available from Kroff Chemical Co. of Pittsburgh, Pa. Another useful AA/AMPS copolymer is Acumer 2100 AA/AMPS copolymer prepared from 60 weight percent AA and 40 weight percent AMPS available from Rohm and Haas Co., a subsidiary of Dow Chemical, of Philadelphia, Pa. Also, ICP-1000, a composition which is available from Superior Well Services of Indiana, Pa., is supplied as a blend of an AA/AMPS copolymer and propylene glycol, and the balance being water, sodium ion, residual sodium bisulfite, catalysts and other non-active components. Other useful AA/AMPS copolymers include those disclosed in U.S. Pat. No. 3,928,196, incorporated by reference herein.

Other non-limiting examples of suitable copolymers useful as material (a) include those prepared from unsaturated mono-carboxylic acids and unsaturated sulfonic acids include those disclosed in U.S. Pat. No. 4,640,793, incorporated by reference herein.

Other non-limiting examples of suitable reaction products useful as material (a) include copolymers prepared from acrylic acid and sulfonated methacrylic acid ether (AA/

SPME) such as AQUATREAT AR-540 available from Alco Chemical of Chattanooga, Tenn. or those disclosed in U.S. Pat. No. 4,892,898, incorporated by reference herein.

Other non-limiting examples of suitable copolymers useful as material (a) include copolymers prepared from acrylic acid and allyl-2-hydroxypropyl sulfonic acid ether (AA/AHPSE) such as HPS-1 available from GE Betz, or those disclosed in U.S. Pat. No. 4,560,481, incorporated by reference herein.

Other non-limiting examples of suitable copolymers useful as material (a) include those having repeat units:

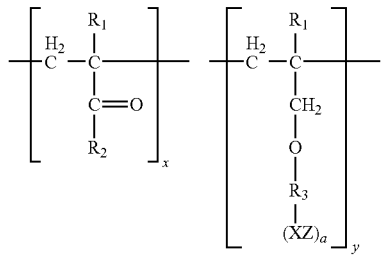

wherein $R_1$ is H or lower alkyl ($C_1$-$C_3$); $R_2$ is OH or OM, or $NH_2$; $R_3$ is a hydroxy substituted alkyl or alkylene radical having from 1 to 6 carbon atoms or a non-substituted alkyl or alkylene radical having from 1 to about 6 carbon atoms; X, when present, is an anionic radical selected from the group consisting of $SO_3$, $PO_3$, $PO_4$, and COO; Z, when present, is H or hydrogen or any water soluble cation or cations which together counterbalance the valence of the anionic radical; a is 0 or 1; and the molar ratio of x:y is between about 30:1 to about 1:20, such as are disclosed in U.S. Pat. Nos. 4,895,663, 4,895,664, 4,944,885, 4,801,387, and 4,869,845, each incorporated by reference herein. The number average molecular weight may fall within the range of 1,000 to 1,000,000 grams/mole.

Other non-limiting examples of suitable copolymers useful as material (a) include those having as repeat units: (i) at least one sulfonated styrene moiety:

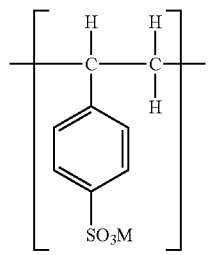

and (ii) at least one moiety derived from maleic anhydride:

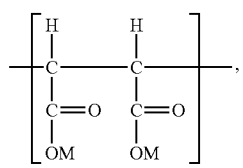

wherein M is a water soluble cation, or each M is independently selected from $NH_4$, H, Na, or K. Non-limiting examples of such copolymers include VERSA TL-4 sulfonated styrene copolymer available from Akzo-Nobel and those disclosed in U.S. Pat. No. 4,288,327, incorporated by reference herein.

Other non-limiting examples of suitable copolymers useful as material (a) include CARBOSPERSE™ K-798 terpolymer of acrylic acid, 2-acrylamido-2-methylpropyl sulfonic acid and sulfonated styrene (AA/AMPS/SS) available from Lubrizol Advanced Materials, Inc. of Cleveland, Ohio, and those disclosed in U.S. Pat. No. 4,952,327, incorporated by reference herein.

In some non-limiting embodiments, the reactants used to prepare material (a) further comprise at least one ethylenically unsaturated material that is different from (1) the at least one ethylenically unsaturated, carboxylic acid functional material or anhydride thereof; and (2) the at least one ethylenically unsaturated, sulfonyl functional material, and the at least one ethylenically unsaturated, sulfonate functional material. The ethylenically unsaturated material that is different from (1) and (2) is chemically different from (1) and (2), i.e., has at least one different atom or arrangement of atoms from (1) and (2). Non-limiting examples of suitable ethylenically unsaturated materials that are different from (1) and (2) include at least one monomer selected from the group consisting of acrylamides, vinyl esters, vinyl acetates and mixtures thereof, for example tert-butyl acrylamide; 2-propenoic acid, 2-methyl-, methyl ester; and mixtures thereof. In some non-limiting embodiments, the ethylenically unsaturated materials different from (1) and (2) can comprise up to about 60 weight percent of the at least one ethylenically unsaturated material (1) above, or about 0.1 to about 60 weight percent, or about 0.5 to about 30 weight percent, or about 1 to about 15 weight percent, on a basis of total weight of the reactants.

Non-limiting examples of such copolymers useful as material (a) include ACUMER 3100 terpolymer of acrylic acid, 2-acrylamido-2-methylpropyl sulfonic acid and tert-butyl acrylamide (AA/AMPS/TBAM) available from Mid South Chemical Co., Inc. of Ringgold, La. or Rohm and Haas Co.; PRISM terpolymer of acrylic acid, sulfomethylacrylamide and acrylamide (AA/SMA/AM) available from Nalco Chemical; or those disclosed in U.S. Pat. Nos. 4,711,725, 4,801,388, and 5,282,976, each incorporated by reference herein.

In some non-limiting embodiments, the reactants used to prepare material (a) further comprise at least one ethylenically unsaturated polyalkylene oxide. Non-limiting examples of suitable ethylenically unsaturated polyalkylene oxides include those selected from the group consisting of allyl polyethylene glycol, methallyl polyethylene glycol, polyethylene glycol acrylate, polyethylene glycol methacrylate, methoxy allyl polyethylene oxide, alkoxyallyl polyethylene oxide, allyl polypropylene glycol, methallyl polypropylene glycol, polypropylene glycol acrylate, polypropylene glycol methacrylate, methoxy allyl polypropylene oxide, alkoxyallyl polypropylene oxide, and mixtures thereof.

Non-limiting examples of such copolymers useful as material (a) include TRC-271 copolymer prepared from AA, AMPS and ($CH_2CH_2O_5$)H-Methacrylic acid ether (HEM-5), available from Nalco Company, or copolymers of unsaturated carboxylic acid, unsaturated sulfonic acid and unsaturated polyalkylene oxide, such as are disclosed in U.S. Pat. No. 4,618,448, incorporated by reference herein. The ethylenically unsaturated polyalkylene oxide(s) can comprise about 0.1 to about 60 weight percent, or about 0.5 to about 30 weight percent, or about 1 to about 15 weight percent, on a basis of total weight of the reactants.

The aqueous composition can comprise about 10 parts per million (ppm) active to about 10,000 ppm of material (a), or about 10 to about 1,000 ppm, or about 10 to about 1,500 ppm, on a basis of total weight of the components of the aqueous composition.

In some non-limiting embodiments, the material (a) is at least partially water soluble. As used herein with respect to the material (a), "water soluble" means that the material (a) is capable of being at least partially or fully dissolved in water at ambient temperature (about 25° C.). The solubility of a component of the fluid treatment systems or compositions of the present invention, for example solubility of the material (a), can be determined by adding 1.0 weight percent of the component to water at 25° C. and mixing thoroughly (about 5 minutes) with a magnetic stirrer. The mixture is permitted to stand for 24 hours and the clarity and separation of components of the mixture is assessed by visual observation. A clear, generally haze-free solution is "water soluble", a hazy/turbid solution is "water dispersible" or "partially water soluble", and a mixture that separates into layers or has noticeable solid particulates is "water insoluble".

The fluid treatment systems or compositions comprise at least one friction reducing agent (b) selected from the group consisting of guar gums, hydratable cellulosic materials, polyacrylamides, viscoelastic surfactants and mixtures thereof. As used herein, "friction reducing agent" means a material that alters fluid rheological properties to reduce energy loss associated with friction created within the fluid or between the fluid and tubing or piping as the fluid flows though the tubing or piping. Generally, friction reducing agents decrease the turbulence induced as the fluid flows. The determination of whether a material is a friction reducing agent can be made by comparing the pressure drop in turbulent flow in a closed loop piping system such as is described in Example 3 using two aqueous compositions containing the same components, with one composition replacing a portion of the water component with the friction reducing agent. If the pressure drop is less for the composition containing the proposed friction reducing agent, then the friction reducing agent is functioning as a friction reducer. In some non-limiting embodiments, the percent friction reduction can be at least 5%, or at least 10%, or at least 20% or more. Methods for determining the percent friction reduction are described in Example 3 below.

The friction reducing agent(s) can comprise about 10 parts per million (ppm) active to about 20,000 ppm of the aqueous compositions, or about 10 to about 10,000 ppm, or about 10 to about 1,500 ppm on a basis of total weight of the components of the aqueous composition.

In some non-limiting embodiments, the friction reducing agent comprises one or more guar gums. The guar gum can be non-hydrolyzed or partially hydrolyzed (PHGG), and can be produced by the partial enzymatic hydrolysis of guaran, the galactomannan of the endosperm of guar seeds (guar gum). PHGG is a neutral polysaccharide consisting of a mannose backbone chain with single galactose side units occurring on almost two out of every three mannose units. The average molecular weight can be about 25,000 Daltons. Other useful guar materials include hydroxypropylguar, carboxymethylhydroxypropylguar, carboxymethylguar and mixtures thereof.

In some non-limiting embodiments, the friction reducing agent comprises one or more viscoelastic surfactants. As used herein, "viscoelastic" means a viscous liquid having elastic properties, i.e., the liquid at least partially returns to its original form when an applied stress is released, or that the elastic (or storage) modulus G' of the fluid is greater than the loss modulus G" as measured using an oscillatory shear rheometer (such as a Bohlin CVO 50) at a frequency of 1 Hz. The measurement of these moduli is described in An Introduction to Rheology, by H. A. Barnes, J. F. Hutton, and K. Walters, Elsevier, Amsterdam (1997).

Non-limiting examples of viscoelastic surfactants (VES), methods for making the same, and amounts suitable for use in a fracturing fluid are disclosed in: U.S. Pat. No. 4,790,958; U.S. Pat. No. 5,258,137; U.S. Pat. No. 5,551,516; U.S. Pat. No. 5,964,295; U.S. Pat. No. 5,979,557; U.S. Pat. No. 6,508,307; U.S. Pat. No. 6,306,800; U.S. Pat. No. 6,140,277; U.S. Pat. No. 6,412,561; U.S. Pat. No. 6,435,277; U.S. Pat. No. 6,446,727; U.S. Pat. No. 7,196,041; U.S. Pat. No. 7,343,978 and U.S. Patent Publication No. 2008/0248976. Each of these U.S. patents and patent publications is incorporated by reference herein. Additional information relating to selected VES-based fluids is found in the SPE article, Polymer-Free Fluids for Hydraulic Fracturing, SPE 38622 (1997), incorporated by reference herein.

For example, U.S. Pat. No. 5,551,516 discloses suitable viscoelastic surfactants, for use in combination with an organic salt and/or alcohol, as follows:

(a) an amine corresponding to the formula:

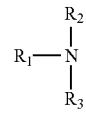

wherein $R_1$ is at least about a $C_{16}$ aliphatic group which may be branched or straight chained and which may be saturated or unsaturated, $R_2$ and $R_3$ are each independently, hydrogen or a $C_1$ to about $C_6$ aliphatic group which can be branched or straight chained, saturated or unsaturated and which may be substituted with a group that renders the $R_2$ and/or $R_3$ group more hydrophilic;

(b) salts of the amine corresponding to the formula:

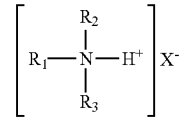

wherein $R_1$, $R_2$ and $R_3$ are the same as defined hereinbefore and $X^-$ is an inorganic anion; and (c) a quaternary ammonium salt of the amine corresponding to the formula:

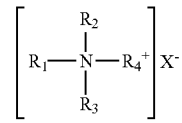

wherein $R_1$, $R_2$ and $R_3$ and $X^-$ are the same as defined hereinbefore and $R_4$ independently constitutes a group which has previously been set forth for $R_3$ and $R_3$, none of $R_1$, $R_2$, $R_3$ or $R_4$ are hydrogen, and the $R_2$, $R_3$ and $R_4$ groups of the amine salt and quaternary ammonium salt may be formed into a heterocyclic 5- or 6-member ring structure which includes the nitrogen atom of the amine.

A non-limiting example of a useful viscoelastic surfactant is a quaternary ammonium salt, erucyl methyl bis(2-hydroxyethyl)ammonium chloride.

The viscoelastic surfactant is capable of forming rod-shaped micelles as opposed to typical surfactant materials which tend to form spherical micelles or sheet-like structures. Non-limiting examples of suitable viscoelastic surfactants include erucyl trimethyl ammonium chloride; N-methyl-N, N-bis(2-hydroxyethyl) rapeseed ammonium chloride; oleyl methyl bis(hydroxyethyl) ammonium chloride; octadecyl methyl bis(hydroxyethyl) ammonium bromide; octadecyl tris (hydroxyethyl) ammonium bromide; octadecyl dimethyl hydroxyethyl ammonium bromide; cetyl dimethyl hydroxyethyl ammonium bromide; cetyl methyl bis(hydroxyethyl) ammonium salicylate; cetyl methyl bis(hydroxyethyl) ammonium 3,4,-dichlorobenzoate; cetyl tris(hydroxyethyl) ammonium iodide; bis(hydroxyethyl) soya amine; N-methyl, N-hydroxyethyl tallow amine; bis(hydroxyethyl) octadecyl amine; cosyl dimethyl hydroxyethyl ammonium bromide; cosyl methyl bis(hydroxyethyl) ammonium chloride; cosyl tris(hydroxyethyl) ammonium bromide; dicosyl dimethyl hydroxyethyl ammonium bromide; dicosyl methyl bis(hydroxyethyl) ammonium chloride; dicosyl tris(hydroxyethyl) ammonium bromide; hexadecyl ethyl bis(hydroxyethyl) ammonium chloride; hexadecyl isopropyl bis(hydroxyethyl) ammonium iodide; N,N-dihydroxypropyl hexadecyl amine, N-methyl, N-hydroxyethyl hexadecyl amine; N,N-dihydroxyethyl dihydroxypropyl oleyl amine; N,N-dihydroxypropyl soya amine; N,N-dihydroxypropyl tallow amine; N-butyl hexadecyl amine; N-hydroxyethyl octadecyl amine; N-hydroxyethyl cosyl amine; cetylamino, N-octadecyl pyridinium chloride; N-soya-N-ethyl morpholinium ethosulfate; methyl-1-oleyl amido ethyl-2-oleyl imidazolinium-methyl sulfate; and methyl-1-tallow amido ethyl-2-tallow imidazolinium-methyl sulfate.

Other non-limiting examples of suitable viscoelastic surfactants include those disclosed in U.S. Pat. No. 6,508,307 having the general formula:

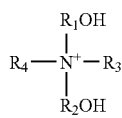

in which $R_1$ and $R_2$ are the same or different and are each short alkyl chains (i.e., from about two to about five carbon atoms in length), $R_3$ is an alkyl group of about one to four carbon atoms, and $R_4$ is a much longer alkyl chain, that can be unsubstituted.

Other non-limiting examples of suitable viscoelastic surfactants include those disclosed in U.S. Pat. No. 7,196,041 having the general formula: $(R_1-X)_nZ$, as defined therein. $R_1$ is an aliphatic group comprising a $C_{10}$-$C_{25}$ straight chain bonded at a terminal carbon atom thereof to X, the straight chain having a length such that a viscoelastic gel is formable by the surfactant in aqueous media; and further comprising at least one side $C_1$-$C_6$ side chain enhancing the solubility of the surfactant in hydrocarbons, and being sufficiently close to said head group and sufficiently short such that the surfactant forms micelles in said viscoelastic gel. X is a charged head group, Z is a counterion, and n is an integer which ensures that the surfactant is charge neutral. X may be a carboxylate ($-COO^-$), quaternary ammonium ($-NR_2R_3R_4^+$), sulphate ($-OSO_3^-$), or sulphonate ($-SO_3^-$) charged group; N being a nitrogen atom, and $R_2$, $R_3$ and $R_4$ being $C_1$-$C_6$ aliphatic groups, or one of $R_2$, $R_3$ and $R_4$ being a $C_1$-$C_6$ aliphatic group and the others of $R_2$, $R_3$ and $R_4$ forming a five- or six-member heterocylic ring with the nitrogen atom. When X is a carboxylate, sulphate, or sulphonate group, Z may be an alkali metal cation or an alkaline earth metal cation, such as $Na^+$ or $K^+$. When X is a quaternary ammonium group, Z may be a halide anion, such as $Cl^-$ or $Br^-$, or a small organic anion, such as a salicylate. In some non-limiting embodiments, the surfactant is an alkali metal salt of 2-methyl oleic acid or 2-ethyl oleic acid.

Another non-limiting example of a suitable viscoelastic surfactant is erucyl-N,N-di-(2-hydroxyethyl)-N-methylammonium chloride (EHMAC).

In some non-limiting embodiments, the friction reducing agent comprises one or more hydratable cellulosic materials. Non-limiting examples of suitable hydratable cellulosic materials include those selected from the group consisting of cellulose, methyl cellulose, hydroxyethyl cellulose, grafted hydroxyethyl cellulose, hydroxypropyl cellulose, hydroxymethyl cellulose, carboxymethyl cellulose, carboxymethylhydroxyethyl cellulose and mixtures thereof.

In some non-limiting embodiments, the friction reducing agent comprises one or more polyacrylamides. Non-limiting examples of suitable polyacrylamides include water-in-oil emulsion polymers comprising a polymer or copolymer comprising repeat units from an acrylamide monomer, such as are disclosed in U.S. Pat. No. 7,482,310, incorporated herein by reference herein. Although the molecular weight of the polymer or copolymer can be difficult to determine, it can be measured using gel permeation chromatography (GPC) using acrylamide or poly(styrene sulfonate) standards as is known in the art. As such, the molecular weight of the polymer or copolymer can be at least 10,000, in some cases at least 25,000, and in other cases at least 50,000. Also, the molecular weight can be up to 50,000,000, in some cases up to 10,000,000, and in other cases up to 1,000,000 as measured using GPC techniques. The molecular weight of the polymer or copolymer can vary between any of the values recited above. For example, suitable polyacrylamides can comprise one or more repeat units according to Formula I:

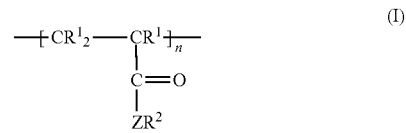

wherein each occurrence of $R^1$ is independently selected from H, methyl and ethyl; n is an integer from 10 to 10,000,000; Z is selected from $-O-$ and $-NR^2-$; and each occurrence of $R^2$ is independently selected from the group consisting of H, $C_1$-$C_{22}$ linear, branched or cyclic alkyl, aryl, alkaryl, aralkyl or alkenyl group, $-R^3-NR^2_2$, $-R^3-N^+R^2_3X$, and $-R^3-SO_3Y$, wherein $R^2$ is as previously defined; $R^3$ is a divalent linking group selected from the group consisting of $C_1$-$C_{22}$ linear, branched or cyclic alkylene, arylene, alkarylene, aralkylene or alkenylene, poly(ethyleneoxide) and poly(propyleneoxide); Y is H or an alkali metal ion; and X is a halide or methylsulfate.

As used herein the term "water-in-oil emulsion polymer" refers to a system or composition having a hydrophobic liquid as a continuous phase and an aqueous solution or gel as a dispersed phase, where the aqueous phase includes one or more water soluble or water dispersible polymers. The dispersed phase, present as droplets and/or discrete microgels, can have size ranging from at least 10 nm up to 500 microns. The size of the droplets and/or discrete microgels can be determined by light scattering and/or scanning electron microscopy, as is known in the art.

As used herein, the phrase "repeat units from an acrylamide monomer" is meant to indicate not only the monomer acrylamide, but also analogous repeat units derived from, for example, methacrylamide, N-methylacrylamide, and N,N-dimethylacrylamide; functionalized acrylamides, such as acrylamidomethylpropane sulfonic acid; hydrolysis products of acrylamide, such as acrylic acid and acrylic and methacrylic acid esters.

In some non-limiting embodiments, the polymer or copolymer contains repeat units from an acrylamide monomer can be non-ionic, anionic, cationic, amphoteric, or ampholytic. As used herein, the term "anionic polymer or copolymer containing repeat units from an acrylamide monomer" refers to polymers containing acrylamide repeat units and repeat units from a monomer that can carry a negative charge at an appropriate pH and/or when neutralized with a suitable cation, non-limiting examples being acrylic acid, methacrylic acid, and acrylamidomethylpropanesulfonic acid. As used herein, the term "cationic polymer or copolymer containing repeat units from an acrylamide monomer" refers to polymers containing acrylamide repeat units and repeat units from a monomer that carries a positive charge, non-limiting examples being methacrylamidopropyltrimethyl ammonium chloride, methacryloyloxyethyl trimethyl ammonium methylsulfate, and dimethyl diallyl ammonium chloride. As used herein, the term "amphoteric polymer or copolymer containing repeat units from an acrylamide monomer" refers to polymers containing acrylamide repeat units and repeat units from a monomer that carries a positive charge at an appropriate pH and a monomer that carries a negative charge at an appropriate pH. Non-limiting examples of the former are methacrylamidopropyldimethylamine, methacryloyloxyethyldimethylamine and methyl diallyl amine, and the latter are acrylic acid, methacrylic acid and maleic acid. As used herein, the term "ampholytic polymer or copolymer containing repeat units from an acrylamide monomer" refers to polymers containing acrylamide repeat units and repeat units from a monomer that carries a positive charge and a monomer that carries a negative charge at an appropriate pH. Non-limiting examples of the former are methacrylamidopropyltrimethyl ammonium chloride, methacryloyloxyethyl trimethyl ammonium methylsulfate, acryloyloxyethyl trimethyl ammonium chloride and dimethyl diallyl ammonium chloride, and the latter are acrylic acid, methacrylic acid and maleic acid.

In some non-limiting embodiments, the copolymer containing repeat units from an acrylamide monomer can further comprise repeat units derived from one or more monomers selected from acrylamidopropyl trimethyl ammonium chloride (APTAC), methacrylamidopropyltrimethyl ammonium chloride (MAPTAC), methacryloyloxyethyl trimethyl ammonium chloride (METAC), methacryloyloxyethyl trimethyl ammonium methylsulfate (METAMS), acryloyloxyethyl trimethyl ammonium chloride (AETAC), dimethyl diallyl ammonium chloride (DMDAAC), acrylic acid (AA), methacrylic acid (MAA), 2-acrylamido-2-methylpropane sulfonic acid (AMPSA), 2-methacrylamido-2-methylpropane sulfonic acid (MAMPSA), $C_1$-$C_3$ alkyl acrylate, $C_1$-$C_3$ alkyl methacrylate, n-alkyl acrylamide, methacrylamide, n-alkylmethacrylamide, and/or diacetone acrylamide.

The molecular weight of the polymer or copolymer containing repeat units from an acrylamide monomer is typically approximated by measuring the reduced viscosity of a solution of the polymer using an appropriately sized Ubbelohde Capillary Viscometer at 0.05 g/dl in 1N NaCl at 30° C. and pH of 7. In some non-limiting embodiments, the polymer or copolymer of the aqueous phase has a reduced viscosity of at least 5 dl/g and up to 50 dl/g.

Although the molecular weight of the polymer or copolymer containing repeat units from an acrylamide monomer can be difficult to determine, it can be measured using gel permeation chromatography (GPC) using acrylamide or poly(styrene sulfonate) standards as is known in the art. As such, the molecular weight of the polymer or copolymer can be at least 10,000 and up to 1,000,000 as measured using GPC techniques.

The fluid treatment systems or compositions comprise at least one scale control agent (c) selected from the group consisting of water-soluble polycarboxylates, phosphonates, phosphates, polyphosphates, metal salts and sulfonates. The polycarboxylates, metal salts and sulfonates are chemically different from material (a) discussed above, i.e., have at least one different atom or arrangement of atoms from material (a) discussed above.

Non-limiting examples of suitable water-soluble polycarboxylates, phosphonates, phosphates, polyphosphates, metal salts and sulfonates include disclosed in U.S. Pat. No. 4,640,793, incorporated by reference herein. Non-limiting examples of suitable water-soluble polycarboxylates include polymers derived from homo- and/or copolymers (including terpolymers, tetra-, etc.) of acrylic acid, methacrylic acid, vinyl acetic acid, allyl acetic acid, fumaric acid, phosphinocarboxylic acid, maleic acid or anhydride, itaconic acid, α-halo acrylic acid and β-carboxyethyl acrylic acid. It is possible that the carboxylic acid, from which the polycarboxylate is prepared, is the same carboxylic acid used to prepare the reaction product of material (a). However, the carboxylic acid used to prepare the polycarboxylate is not polymerized with the same ethylenically unsaturated, sulfonyl functional and/or sulfonate functional material as used to prepare material (a) as above. Non-limiting examples of suitable water-soluble phosphonates include hydroxyphosphono acetic acid (HPA), diethylenetriaminepenta(methylenephosphonic acid), hexamethylenediaminetetra-(methylenephosphonic acid), 2-phosphono-1,2,4-tricarboxybutane, amino tri (methylene phosphonic acid), hydroxyethylidene diphosphonic acid, phosphonosuccinic acid, benzene phosphonic acid, 2-aminoethyl phosphonic acid, and polyamino phosphonates, and salts thereof where they exist. Other useful phosphonates are disclosed in U.S. Pat. No. 3,837,803, incorporated by reference herein. Non-limiting examples of suitable water-soluble phosphates include orthophosphate; condensed phosphates, such as sodium hexametaphosphate; phosphate esters; organophosphate esters, such as the lower alkyl mono-, di- and trialkyl phosphates. The alkyl group can be selected from $C_1$ to $C_4$ and may be branched or unbranched. The alkyl group may be substituted with hydroxy, amino, halide, sulfate or sulfonate, alone or in combination; and molecularly dehydrated phosphates. Non-limiting examples of suitable water-soluble metal salts include water-soluble salts of zinc, molybdenum, chromate and sodium silicate and mixtures thereof. Non-limiting examples of suitable water-soluble sulfonates include homo- and/or copolymers of 2-acrylamido-2-methylpropylsulfonic acid, 2-methacrylamido-2-methylpropylsulfonic acid, styrene sulfonic acid, vinyl sulfonic acid, sulfo alkyl acrylate or methacrylate, allyl or methallyl sulfonic acid, sulfonic acid acrylate, 3-methacrylamido-2-hydroxy propyl sulfonic acid, their salts and mixtures thereof.

In some non-limiting embodiments, the fluid treatment systems or compositions can further comprise at least one polyether polyamino phosphonate. Non-limiting examples of suitable polyether polyamino methylene phosphonates are disclosed in U.S. Pat. No. 5,262,061, incorporated by reference herein, and include those of the formula:

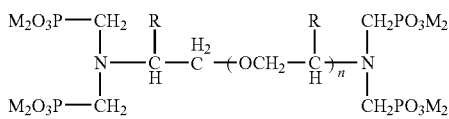

and optionally the N-oxides thereof; where n is an integer or fractional integer which is about 2 to about 12; M is hydrogen or a suitable cation; and each R may be the same or different and is independently selected from hydrogen and methyl.

In some non-limiting embodiments, the scale control agent comprises 2-phosphono-1,2,4-tricarboxybutane, polyacrylic acid and a reaction product prepared from acrylic acid and 2-acrylamido-2-methylpropyl sulfonic acid.

The fluid treatment system(s) or composition(s) of the present invention can be used to treat water, for example to inhibit the formation and/or precipitation of compounds such as metal oxides. In some non-limiting embodiments, the water can comprise metal ions or other contaminants, such as ferrous ions, ferric ions, and/or ferric compounds, as described below. In some non-limiting embodiments, the water can be subterranean water, surface water or brine water.

The components of the fluid treatment system, such as material(s) (a) and friction reducing agent(s) (b), and scale control agent(s) (c) can be combined with the water sequentially (in any order desired) or concurrently. In some non-limiting embodiments, the friction reducing agent(s) (b) is added to the water last. The amount of material (a) added to the water can be at least about 0.001%, or about 0.001% to about 1.0%, or about 0.005 to about 1.0%, or about 0.01% to about 0.5% on a basis of total weight of the aqueous composition (fluid treatment system, water, and any other additives). The amount of friction reducing agent(s) (b) added to the water can be at least about 0.001%, or about 0.001% to about 2.0%, or about 0.01% to about 2.0%, or about 0.02% to about 0.5% on a basis of total weight of the aqueous composition (fluid treatment system, water, and any other additives). The amount of scale control agent(s) (c) added to the water can be at least about 0.1 mg/L, or about 0.2 to about 1,000 mg/L, or about 0.2 to about 100 mg/L on a basis of total weight of the aqueous composition (fluid treatment system, water, and any other additives).

In some non-limiting embodiments, the fluid treatment system or composition is a fracturing fluid for treating water in a subterranean formation penetrated by a well bore. The fracturing fluid comprises water and the fluid treatment system or composition described above.

Suitable water-in-oil emulsion polymers include water-in-oil emulsion polymers containing polymers and copolymers of acrylamide, such as are discussed above. In some non-limiting embodiments, the water-in-oil emulsion polymer includes a hydrophobic oil phase, a surfactant system and a polymer-containing aqueous phase comprising water and the polymer or copolymer containing repeat units from an acrylamide monomer. Commercially available "water-in-oil emulsion polymers" that can be used in the present invention include, but are not limited to, WFR-3B, WFR-5, SAS-2 and Cw-3K polyacrylamides-based products available from Superior Well Services of Indiana, Pa.

In some non-limiting embodiments, the fluid treatment system or composition according to the present invention can comprise or consist of (a) ICP-1000 composition; (b) WFR-3B polyacrylamide and (c) 2-phosphono-1,2,4-tricarboxybutane, polyacrylic acid and a reaction product prepared from acrylic acid and 2-acrylamido-2-methylpropyl sulfonic acid as scale control agents, in a weight ratio of (a):(b) of about 0.005:1 to about 50:1 and in a weight ratio of (b):(c) of about 2:1 to about 1:40. In some non-limiting embodiments, the fluid treatment system is the Gamma FRac™ system available from Superior Well Services.

In some non-limiting embodiments, the polymer-containing aqueous phase including water and the polymer or copolymer containing repeat units from an acrylamide monomer makes up at least about 5 to about 90% by weight of the water-in-oil emulsion polymer.

As discussed above, the fracturing fluid can comprise one or more inorganic microparticles. As used herein, the term "microparticle" means solid particles with very small dimensions, which can range from nanometers to microns. Suitable inorganic microparticles include, but are not limited to, fumed silica, fumed alumina, precipitated silica, colloidal silica, alumina silicates, treated silica, calcium carbonate, silica flour, diatomites, talc, borosilicates, and mixtures thereof. Treated silicas can include surface treated or surface modified silica that has been treated with organic materials (hydrophobic silica) or alumina (alumina treated silica) as is known in the art. In some non-limiting embodiments, the surface area of the inorganic microparticle can range from at least about 1 m²/g to about 1,000 m²/g. The surface area of the microparticles is determined using BET nitrogen absorption as is known in the art. In some non-limiting embodiments, the inorganic microparticles comprise at least about 0.1% to about 10% by weight of the water-in-oil emulsion composition.

In an embodiment of the invention, the water-in-oil emulsion composition comprises at least about 0.005% up to about 20%, or at least about 0.01% up to about 20%, by weight of the fracturing fluid. The water-in-oil emulsion composition can be made as disclosed in U.S. Pat. No. 7,482,310, incorporated by reference herein.

The fracturing fluid can further comprise one or more proppant materials. Suitable proppant materials include, but are not limited to, resin coated or uncoated sand, Ottawa type sand (round), Brady type sand (angular), sintered bauxite, ceramic materials and glass beads. The particle size of the proppant material can range from about 200 µm to about 5,000 µm. The particle size is the weight average determined using a series of Tyler Sieves of various mesh sizes available from W.S. Tyler, Mento, Ohio. Further description of suitable proppant materials, their use and concentrations thereof in the present fracturing fluid are described in Glidley et al., Recent Advances in Hydraulic Fracturing, Chapter 6, "Propping Agents and Fracture Conductivity", Society of Petroleum Engineers, Richardson, Tex., pp. 109-130. In some non-limiting embodiments, the fracturing fluid can comprise about 0.5% to about 30% proppant material based on the weight of the fracturing fluid. In some non-limiting embodiments, the fracturing fluid can comprise about 0.1 to about 10 pounds of proppant material per gallon of fracturing fluid.

The water used to make up the fracturing fluid can be selected from fresh water, recycled water, water containing high dissolved constituents such as flowback water or mine drainage water, unsaturated brine, and saturated brine. Flowback water is the recovered fracturing fluid and produced water which flows back to the surface from an oil or gas well drilling operation and is extracted. Flowback water may have high salinity and total dissolved solids (TDS).

In some non-limiting embodiments, the fracturing fluid can further comprise an additive that is a pH adjusting compound selected from sodium hydroxide, potassium hydroxide, lithium hydroxide, ammonia, sodium carbonate, potassium carbonate, sodium bicarbonate, potassium bicarbonate, sodium diacetate, potassium diacetate, sodium phosphate, potassium phosphate, sodium dihydrogen phosphate, potassium dihydrogen phosphate, and mixtures thereof. These additives are present at a level sufficient to maintain a desired pH. The level of pH adjusting compound can be from about 0.01% to about 1.0% based on the weight of the fracturing fluid.

In some non-limiting embodiments, the fracturing fluid can further comprise a clay stabilizer selected from the group consisting of potassium chloride, sodium chloride, ammonium chloride, tetramethyl ammonium chloride and temporary clay stabilizers. The level of clay stabilizers can be from about 0.1% to about 10% based on the weight of the fracturing fluid.

In some non-limiting embodiments, the fracturing fluid can further comprise a fluid loss control agent selected from the group consisting of silica flour, starches, waxes and resins. The level of fluid loss control agent can range from about 0.01% to about 2.0% based on the weight of the fracturing fluid.

In some non-limiting embodiments, the fracturing fluid can further comprise a delayed breaker for causing the treating fluid to revert to a thin fluid selected from the group of oxidizers, encapsulated oxidizers and enzyme breakers consisting of sodium persulfate, potassium persulfate, ammonium persulfate, magnesium peroxide, sodium chlorite, sodium bromate, alpha and beta amylases, amyloglucosidase, invertase, maltase, cellulose, halogenated isocyanurate, hypochlorites and hemicellulase. The amount of delayed breaker can range from about 0.01% to about 2% by weight based on the weight of the fracturing fluid.

In some non-limiting embodiments, the fracturing fluid can further comprise a biocide, such as 2,2-dibromo-3-nitrilopropionamide, which is available in a 20% solution as KR-153SL biocide from Kroff Chemical Co. Other suitable biocides are known to those skilled in the art. The amount of biocide can range from about 20 to about 2,000 ppm, based upon the total weight of the fracturing fluid.

The fracturing fluid can be injected into a formation by first providing a bore hole or well hole, which may or may not include a casing or liner and may or may not have been shape charged to initiate fractures. The fracturing fluid is pumped into the bore hole or well hole to provide a pressure of about 0.1 to about 2 psi/ft. (ft. referring to the depth of the bore hole or well hole), depending on the composition of the fracturing fluid and the nature of the formation to be fractured. As such, the pressure in the bore hole or well hole can be at least about 500 psi up to about 15,000 psi. While not intending to be bound by any single theory, it is believed that the pressure drives the fluid into cracks, fissures and fractures in the formation, forcing such openings to become larger and propagate. The proppant material tends to wedge into the expanded cracks, fissures and fractures to help hold them open when the pressure is reduced. However, the pressure can act to force water out of the fluid, in an action similar to synersis (i.e., exudation of the liquid component of a gel). This liquid can then seep or imbibe through capillary action into microscopic and larger cracks, fractures and fissures, thus removing water from the fluid, increasing the effective polymer concentration and therefore the viscosity of the fluid. Such increases in viscosity can limit the ability of the fluid to penetrate the formation. It is believed that the microparticles can fill the relatively small cracks, fractures and fissures, slowing or limiting water loss, which increases the productivity and efficiency of the fluid and the fracturing operation.

As discussed in detail above, the air (oxygen) in the ground water causes dissolved ferrous ions contained in the ground water to be oxidized to the insoluble ferric state. Ions in the ferric state readily precipitate, clogging flow pathways in the oil or gas well formation, thus restricting oil or gas flow. Chelating agents such as citric acid have been used as an iron control agent to treat oil and gas well formations. However, improper dosing of certain chelating agents such as citric acid can negatively impact friction reducing additives, for example certain polyacrylamide-based products, such as acrylic acid/acrylamide copolymers. The fluid treatment systems, compositions and fracturing fluids of the present invention can inhibit the formation of metal oxides, such as iron oxide, from metal ions present in the groundwater, such as ferrous ions, while minimizing the adverse impact of the metal ions on performance of the friction reducing agent to enhance the performance of the friction reducing agent. Thus, when the fluid treatment systems, compositions or fracturing fluids of the present invention are mixed with water comprising metal ions, such as ferrous ions, an aqueous composition is formed that inhibits the formation and precipitation of metal oxides. Thus, in some non-limiting embodiments, the present invention provides methods of inhibiting formation and/or precipitation of metal oxides in an aqueous composition comprising metal ions, comprising: mixing an aqueous composition comprising metal ions with any of the above fluid treatment systems or compositions. Non-limiting examples of such metal ions include ferrous ions, chromium ions, zinc ions, manganese ions, aluminum ions, and mixtures thereof.

In some non-limiting embodiments, methods of inhibiting formation and/or precipitation of metal oxides in an aqueous composition or ground water comprising at least 20 milligrams, or at least about 50 mg, or at least about 70 mg, of metal ions (such as ferrous ions) per liter of aqueous composition are provided which comprise: (a) mixing the aqueous composition or water with the fluid treatment system, composition or fracturing fluid of the present invention. In some non-limiting embodiments, one or more additional friction reducing agents or other additives as described above can be included.

Generally, the amount of fluid treatment system or composition according to the present invention administered as a metal stabilizer or iron control agent in down-hole applications is at least about 0.1 mg/L reaction product per mg/L metal ion, or at least about 1.0 mg/L reaction product per mg/L metal ion, or at least about 1.5 mg/L reaction product per mg/L metal ion, or at least about 1.6 mg/L reaction product per mg/L metal ion, or at least about 2.0 mg/L stabilizer per mg/L metal ion, or at least about 10 mg/L stabilizer per mg/L metal ion, or at least about 20 mg/L stabilizer per mg/L metal ion, or at least about 40 mg/L stabilizer per mg/L metal ion, depending upon such factors as system demand and pH.

In some non-limiting embodiments, the fracturing fluid can be an acid fracturing fluid. The acid fracturing fluids of the present invention can comprise water, acid, and a fluid treatment system or composition according to the present invention as described in detail above. Non-limiting examples of suitable acids include hydrochloric acid, acetic acid, formic acid, hydrofluoric acid, sulfamic acid, chlorinated acetic acid, gelled or emulsified acids, and mixtures thereof. The amount of acid in the fracturing fluid can range from about 0.01 weight percent to about 25 weight percent based upon the total weight of the fracturing fluid. Such acid fracturing fluids can be used for matrix acidizing treatments and/or fracture acidizing treatments. In matrix acidizing, the acid fluid flows through the flow pathways in a formation, dissolving solids and fines entrained in pore throats and pore spaces that impede oil or gas flow. Acid fracturing is an alternative to hydraulic fracturing with proppant. The acid etches the fracture face to create voids and points of support which hold the rock channel open.

The present invention will further be described by reference to the following examples. The following examples are merely illustrative of the invention and are not intended to be limiting. Unless otherwise indicated, all percentages are by weight.

EXAMPLES

Example 1

Citric acid functions stoichiometrically (one mole of citric acid complexes one mole of iron), however additional citric acid is needed to drive the formation of the metal complex, the additional amount being a function of pH (i.e., the conditional stability constant). On a stoichiometric basis, 2.0 mg/L $Fe^{+2}$ would require 6.88 mg/L citric acid. Interestingly, a Minimum Effective Dose ("MED") of 7.50 mg/L is close to the stoichiometric requirement.

The ability to stabilize iron in an aqueous sample was evaluated using the "High Iron Stabilization Test" at 70 mg $Fe^{+2}$/per liter of water. Samples of conventional iron stabilizers, such as citric acid, the tetrasodium salt of ethylenediaminetetraacetic acid ($Na_4EDTA$), and triethanolamine (TEA) were evaluated and compared to compositions including sulfonyl and carboxyl functional reaction products according to the present invention, such as KR-DP0184 AA/AMPS copolymer prepared from 60 weight percent AA and 40 weight percent AMPS available from Kroff Chemical Co., as discussed in detail below.

High Iron Stabilization Test

The iron stabilization test evaluates and quantifies the ability of an iron control additive to maintain the iron in soluble form and to prevent precipitation. This is accomplished by measuring the iron content that remains in solution after a specified time under test conditions and comparing to an untreated control. Conditions for the test were:

| | |
|---|---|
| pHi: | 8.5 |
| pHf: | 8.0-8.5 |
| Temperature: | Ambient (about 25° C.) |
| Test Duration: | 2.0 hr |
| Mixing Rate: | 20 rpm on gang stirrer |
| Filter: | >20-25 micron |
| Matrix: | Synthetic 4X Pittsburgh water |
| Initial $Fe^{+2}$ (mg/L) | 70.0 |

The percent stabilization is calculated as follows:

$$\% \text{ Stabilization} = \frac{(Fe_{final} - Fe_{blank}) \times 100\%}{(Fe_{initial} - Fe_{blank})}$$

where:

$Fe_{initial}$=Initial concentration of dissolved iron (~70.0 mg/L)
(This is the value for the "Start" sample.)

$Fe_{final}$=Final concentration of dissolved iron in treated test
$Fe_{blank}$=Final concentration of dissolved iron in untreated test The Minimum Effective Dose ("MED") for the scale inhibition tests is defined as the dosage at which ≥90% stabilization is attained.

Sample Calculation

Suppose the final iron concentration, $Fe_{final}$, for an iron stabilizer is 60.0 mg/L, the amount of iron remaining in the blank, $Fe_{blank}$, is 1.3 mg/L, and the initial Fe(II) concentration, $Fe_{initial}$ is 69.5, The % Stabilization would be calculated as follows:

$$\% \text{ Stabilization} = \frac{(60.0 - 1.3) \times 100\%}{(69.5 - 1.3)} = 86.1\%$$

The composition of the 4× Pittsburgh Water matrix and the composition of the test water are listed in Table 1 below.

TABLE 1

| Ion | 4X Pittsburgh Water (mg/L) | Test Water* mg/L |
|---|---|---|
| $Ca^{2+}$ | 88.3 | 88.3 |
| $Mg^{2+}$ | 24.0 | 24.0 |
| $Na^+$ | 71.0 | 240.2 |
| $Fe^{2+}$ | — | 70.0 |
| $SO_4^{2-}$ | 328.9 | 689.3 |
| $Cl^-$ | 70.0 | 70.0 |
| Alkalinity (as $CaCO_3$) | 32.8 | 151.0 |
| Cations (Meq) | 9.47 | 19.34 |
| Anions (Meq) | 9.48 | 19.35 |

*Test Water Composition included Fe (II) Stock Solution and the addition of the 1.0 N NaOH needed to neutralized the Fe (II) Stock Solution To determine the viability of using sulfonyl and carboxylic acid functional polymers compositions in down-hole applications, the High Iron Stabilization Test was developed with an initial ferrous ion level of 70 mg/L. Control compositions including Citric Acid, $Na_4EDTA$, TEA and Test Compositions containing sulfonyl and carboxylic acid functional polymers according to the present invention were evaluated.

Composition of Stabilizers:

KR-DP0184: 60/40 AA/AMPS (Acrylic Acid/2-Acrylamido-2-methylpropylsulfonic Acid), Mw=17,700; Mn=5,900

Acumer 3100: ~65/22/13 AA/AMPS/TBAM (Acrylic Acid/2-Acrylamido-2-methylpropylsulfonic Acid/Tert-butylacrylamide), Mw=4,500

Prism: 20-80/5-55/5-60 AA/SMA/AM (Acrylic Acid/Sulfomethylacrylamide/Acrylamide), Mw=7,000-90,000

HPS-1: ~52.4:47.6 AA/AHPSE (Acrylic Acid/Allyl-2-hydroxypropylsulfonic acid ether). Monomer ratio is 3:1. Mw~14,000.

Aquatreat AR-540: AA/SPME/Monomer 3/Monomer 4 (Acrylic Acid/Sulfonated Phenol Methacrylic Ether/2-Propene-1-sulfonic acid, 2-methyl/2-Propenoic Acid, 2-methyl-, methyl ester) $[CH_2CHCOO]_W$—$[CH_2CH_3CCH_2OC_6H_4SO_3]_X$—$[CH_2CH_3CCH_2SO_3]_Y$—$[CH_2CH_3CCOOCH_3]_Z$, Mw=15,277; Mn=4,961

K-798: ~60/34/6 AA/AMPS/SS (Acrylic Acid/2-Acrylamido-2-methylpropylsulfonic Acid/Sulfonated Styrene), MW=1,000-10,000

Acumer 2000: 75/25 AA/AMPS (Acrylic Acid/2-Acrylamido-2-methylpropylsulfonic Acid), Mw=4,500

Note: Monomer Ratios are weight ratios as opposed to mole ratios.

Tables 2a-2c present the testing results. The first tier of compositions, containing sulfonyl and carboxylic acid functional polymers KR-DP0184, Acumer 3100, Prism, Acumer 2000, and K-798 each required a minimum active dose (MED) of 100-120 mg/L. The second tier of compositions, containing sulfonyl and carboxylic acid functional polymers HPS-1 and AR-540 each required an active dose of 125-150 mg/L. Citric acid performed the best, with an MED of 80 mg/L. The MED for $Na_4EDTA$ was 700 mg/L. TEA was ineffective.

Interestingly, the MED of 80 mg/L for citric acid was lower than even the stoichiometric requirement of 241 mg/L (3.4 mg Citric Acid/mg Fe). This would suggest that chelation was not the only mechanism of action in effect. In contrast, the MED of 700 mg/L for $Na_4EDTA$ exceeded the stoichiometric dose of 477 mg/L (6.8 mg $Na_4EDTA$ per mg Fe) as would be expected.

The results of the High Iron Stabilization Studies indicate that the tested sulfonyl and carboxylic acid functional polymers are effective iron stabilizers even at the extremely high iron levels present down hole.

The results show that as expected sulfonyl and carboxylic acid functional polymers provide good Fe(II) stabilization under high iron conditions. Factors such as the degree of sulfonation and molecular weight appear to be optimized with each of the top tier products. With the top performing polymers, the ratio of mg/L polymer to mg/L Fe(II) is about 1.6:1.00.

TABLE 2a

High Iron Stabilization Test Results mg/L Active

| Product | MED* | 50 | 60 | 70 | 75 | 80 | 90 | 100 | 110 |
|---|---|---|---|---|---|---|---|---|---|
| Citric Acid | 80 | 29.0 | | | 87.0 | 94.1 | 97.5 | 98.9 | |
| | | | | | 82.7 | 94.1 | | 95.6 | |
| KR-DP0184 | 110 | 1.6 | 4.4 | 3.7 | | 31.7 | | 81.8 | 92.5 |
| | | | | | | | | 87.2 | 89.3 |
| Acumer 3100 | 100 | | | | | 65.3 | | 88.4 | |
| | | | | | | | | 92.0 | |
| | | | | | | | | 93.2 | |
| Prism | 110-120 | | | | | | | 69.3 | |
| HPS1 | 125-150 | | | | | | | | |
| AR-540 | 125-150 | | | | | | | | |
| K-798 | 110-150 | | | | | | | 77.7 | |
| Acumer 2000 | 120 | | | | | | | 66.0 | |
| $Na_4EDTA$ | 700 | | | 9.5 | | | 6.0 | 14.0 | |
| TEA** | None | | | | | | | | |

**Triethanolamine

TABLE 2b

High Iron Stabilization Test Results mg/L Active

| Product | MED* | 120 | 125 | 130 | 150 | 200 | 250 | 300 | 500 |
|---|---|---|---|---|---|---|---|---|---|
| Citric Acid | 80 | | | | | | | | |
| KR-DP0184 | 110 | | 95.1 | | | | | | |
| Acumer 3100 | 100 | 98.4 | | | | | | | |
| Prism | 110-120 | 96.5 | | | | | | | |
| HPS1 | 125-150 | 76.6 | | | 98.3 | | | | |
| | | 87.3 | | | | | | | |
| AR-540 | 125-150 | 81.4 | | | 96.9 | | | | |
| K-798 | 110-150 | | | | 94.7 | | | | |
| Acumer 2000 | 120 | 88.2 | | | | | | | |
| | | 92.2 | | | | | | | |
| $Na_4EDTA$ | 700 | | | | | 27.4 | 35.6 | 44.2 | 80.9 |
| TEA** | None | | | | 1.1 | | | 3.5 | 4.9 |

**Triethanolamine

TABLE 2c

High Iron Stabilization Test Results mg/L Active

| Product | MED* | 600 | 700 |
|---|---|---|---|
| Citric Acid | 80 | | |
| KR-DP0184 | 110 | | |
| Acumer 3100 | 100 | | |
| Prism | 110-120 | | |
| HPS1 | 125-150 | | |
| AR-540 | 125-150 | | |
| K-798 | 110-150 | | |
| Acumer 2000 | 120 | | |
| $Na_4EDTA$ | 700 | 87.4 | 91.2 |
| | | | 91.4 |
| TEA** | None | | |

**Triethanolamine

Example 2

The threshold inhibition test evaluates and quantifies the ability of a scale inhibitor to prevent precipitation of a particular scale. This is accomplished by measuring the concentration of cations that remain in solution after a specified time under supersaturated conditions and comparing to the concentration in an untreated control. The percent inhibition is calculated as follows:

$$\% \text{ Inhibition} = \frac{(C_T - C_{un}) \times 100\%}{(C_i - C_{un})}$$

Where:
$C_T$=cation concentration in the treated filtered sample
$C_{un}$=cation concentration in the filtered untreated sample
$C_i$=cation concentration in the initial sample The Minimum Effective Dose ("M.E.D.") for the scale inhibition tests is defined as the dosage at which ≥90% inhibition is attained. KR-DP0515 is a 1:1:1 blend, on an active basis, of (60/40) PAA/AMPS copolymer:PAA:PBTC, respectively.

For this example, treated and untreated supersaturated solutions containing calcium chloride and sodium bicarbonate were prepared at an initial pH of 8.00 to 8.35 in Erlenmeyer flasks. The flasks were then heated in a water bath for 24 hours at 60° C. After the incubation period, the samples were filtered and then the soluble calcium concentration determined by titration with EDTA. As shown in Table 3, on an active basis, the M.E.D. for KR-DP0515 is 0.70 mg/L, indicating that KR-DP0515 is an effective calcium carbonate scale inhibitor when compared to other known calcium carbonate scale inhibitors.

TABLE 3

Calcium Carbonate Threshold Inhibition Test Results

| Active Dose (mg/L) | KR-DP0515 | PBTC | PAA | 60/40 AA/AMPS copolymer | HEDP |
|---|---|---|---|---|---|
| 0.10 | | | | | 74.4 |
| 0.20 | | 63.7 | | | 94.4 |
| 0.30 | 72.5 | 94.1, 80.2 Avg. = 87.2 | | | 100.0 |
| 0.40 | 81.4 | 101.0, 98.1 Avg. = 99.6 | | | |
| 0.50 | 84.6 | 101.0 | | 46.0 | |
| 0.60 | 87.8, 82.0 Avg. = 84.9 | | | | |
| 0.70 | 89.6, 101.1, 92.0 Avg. = 94.2 | | | | |
| 0.75 | | | 84.2 | | |
| 0.80 | 95.6, 90.0 Avg. = 92.8 | | 87.9, 27.3 Avg. = 57.6 | | |
| 0.90 | | | 87.9, 87.8 Avg. = 87.9 | | |
| 1.00 | | | 96.0 | 76.0 | |
| 1.25 | | | 97.0 | | |
| 1.50 | | | | 82.0 | |
| 2.00 | | | | 77.0 | |
| 2.50 | | | | 70.3 | |
| 3.00 | | | | 77.0 | |
| 4.00 | | | | 91.5, 75.6 Avg. = 83.6 | |
| 5.00 | | | | 84.6, 80.2 Avg. = 82.4 | |
| 6.00 | | | | 102.2 | |
| 7.00 | | | | 70.0 | |
| 8.00 | | | | | |
| 9.00 | | | | | |
| 10.00 | | | | 97.2 | |
| M.E.D.* | 0.70 | 0.40 | 1.00 | For doses ≥1.00, Avg. % I = 82.0** | 0.20 |

**Average % I is 82%; is not ≥90% at doses greater or equal to M.E.D.

Conditions:
24 hr @ 60° C. (140° F.)
pHi: 8.00-8.35
200 mg/L $Ca^{+2}$, 600 mg/L $HCO_3^-$ For this example, treated and untreated supersaturated solutions containing calcium chloride and sodium sulfate were prepared and adjusted to an initial pH of 6.50 to 7.00 in Erlenmeyer flasks. The flasks were then heated in a water bath for 24 hours at 60° C. After the incubation period, the samples were filtered and then the soluble calcium concentration determined by titration with EDTA. As shown in Table 4, on an active basis, the M.E.D. for Super TSC is 2.0 mg/L, indicating that KR-DP0515 is an effective calcium sulfate scale inhibitor when compared to other known calcium carbonate scale inhibitors. Synergy of components was observed with the KR-DP0515 at a dosage of 2.50 mg/L, active basis. At a product dose of 2.5 mg/L, the component treatment dosages are: 0.83 mg/L PBTC, 0.83 mg/L PAA, and 0.83 mg/L 60/40 AA/AMPS. The Expected Percent Inhibition, based on the contribution of components, would be 7.5%+22.5%+15.0%=45%. The observed inhibition for the blended composition is 100.0%, indicating a synergy between components.

TABLE 4

Calcium Sulfate Threshold Inhibition Test Results

| Active Dose (mg/L) | KR-DP0515 | PBTC | PAA | 60/40 AA/AMPS copolymer | HEDP |
|---|---|---|---|---|---|
| 0.50 | 7.2 | | 3.7 | | |
| 0.83 | | 7.5 | 25.2, 19.8 Avg. = 22.5 | 15.0 | |
| 1.00 | 15.3 | | 97.3 | | |
| 1.50 | 55.9 | | 99.1 | | |
| 2.00 | 81.1, 95.3, 93.7 Avg. = 90.0 | 27.9 | 98.2 | | |
| 2.50 | 100.0 | 52.3 | | | 9.0 |
| 3.00 | | 73.9, 45.9 Avg. = 59.9 | | 84.7 | |
| 3.50 | | 95.5 | | 99.1 | |
| 4.00 | | | | 100.0 | |
| 4.50 | | | | | |
| 5.00 | | | | | 19.8 |
| M.E.D.* | 2.00 | 3.50 | 1.00 | 3.50 | >5.00 |

Conditions:
24 hr @ 60° C. (140° F.)
pHi: 6.5-7.0
2000 mg/L $Ca^{+2}$, 4800 mg/L $SO_4^{-2}$ For this example, treated and untreated supersaturated solutions containing barium chloride and sodium sulfate were prepared and adjusted to an initial pH of 7.00 to 8.00 in plastic bottles. The bottles were then heated in an oven for 24 hours at 30° C. After the incubation period, the samples were filtered and then the soluble barium concentration determined. As shown in Table 5, on an active basis, the M.E.D. for KR-DP0515 was 3.0 mg/L, indicating that KR-DP0515 performed as well or better than its components for barium sulfate scale inhibition.

TABLE 5

Barium Sulfate Threshold Inhibition Test Results

| Active Dose (mg/L) | Percent Inhibition (%) | | | |
|---|---|---|---|---|
| | KR-DP0515 | PBTC | PAA | 60/40 AA/AMPS copolymer |
| 1.00 | | 51.2, 0.0 Avg. = 25.6 | 55.8, 31.7 Avg. = 43.8 | 58.1, 24.1, 0.0 Avg. = 27.4 |
| 1.50 | | | | |
| 2.00 | 58.4 | 74.4 | | |
| 2.50 | | | | |
| 3.00 | 95.9 | 39.0 | 48.8 | |
| 3.50 | | | | |
| 4.00 | | 95.3 | 73.2 | |
| 5.00 | | | | |
| 6.00 | | 99.2 | | |
| 7.00 | | | | |
| 8.00 | | | | |
| 9.00 | | | | |
| 10.00 | | | | 24.1, 56.1 Avg. = 40.1 |
| 15.00 | | | | 63.4 |
| 20.00 | | | | 89.9 |
| M.E.D.* | 3.00 | >4.00 | | >10.0 |

Conditions:
24 hr @ 30° C. (86° F.)
pHi: 7.0-8.0
68.7 mg/L $Ba^{+2}$, 48.0 mg/L $SO_4^{-2}$ Example 3

A fluid treatment system according to the present invention was evaluated for friction reduction properties on a friction loop test apparatus.

Referring now to FIG. 1, the friction test apparatus, indicated generally as 10, consisted of a reservoir chamber 12, a pump 14 connected to the bottom 16 of the reservoir chamber 12, and a closed loop piping system 18 which received the test fluid from the pump and returned the test fluid to the reservoir chamber 12. The closed loop piping system 18 includes a flow meter (FM) for monitoring the flow rate of the test fluid through the pipe.

The treatment chemistry was added to the water returning from the closed loop piping system 18 as it entered the reservoir chamber 12. High turbulence at the injection point 20 ensured thorough and rapid dispersion of the treatment in the reservoir chamber 12. The friction test apparatus 10 was configured to provide flow through a section of pipe 22 under a fixed, steady-state flow rate. For the following examples, the Reynolds' number of the fluid in the pipe 22 was calculated to be 58,100 and was well within the turbulent flow regime. For each test, a differential pressure gauge 24 was used to measure the pressure differential between the pressure in the first position (P1) and the second position (P2) in the piping system 18. The length 26 of the pipe 22 between the first position (P1) and the second position (P2) was at least 10 times the pipe diameter, or at least about 2 feet. The frictional loss through the pipe 22 between P1 and P2 was proportional to the pressure drop: P1 minus P2=ΔP. Precision measurements of flow and pressure are required for an accurate assessment of the friction reduction. A datalogger 26 recorded pressure and flow measurements in 1 second increments during the test run. After the pressure differential for the base fluid was recorded, then the treatment was injected. The treatment rate of the liquid treatment products are reported in (gpt) or gallons per 1000 gallons of base fluid.

The differential pressure reading 60 seconds after injection was used in the analysis. The base fluid consisted of the water, dissolved ions and treatment chemicals prior to adding the friction reducing agent. The percent of friction reduction achieved by the water treatment was determined by measuring the differential pressure for base fluid and comparing to differential pressure for the treated fluid, according to the following formula:

Friction Reduction(%)=($\Delta P_{base\,fluid}$−$\Delta P_{treated\,fluid}$)/$\Delta P_{base\,fluid}$*100.

One skilled in the art would understand that the diameter and length of the pipe 22 can vary, as long as steady-state turbulent flow conditions are maintained between P1 and P2. The pipe diameter can be about ¼ inch to about 2 inches, and the pipe length can be about 10 feet to about 200 feet. Space and cost considerations can be taken into account in determining the pipe dimensions for the test unit. Since the percent of friction reduction is determined by relative pressure drop for tests with and without the fluid treatment, the actual dimensions of the piping are not important as long as the dimensions fall within the ranges specified above and steady-state turbulent is maintained.

The adverse impact of ferrous iron on the performance the WFR-3B friction reducing agent was evaluated. An amount of a 5% (as $Fe^{+2}$) solution of ferrous sulfate solution was added to the recirculating fresh water in the friction test apparatus to achieve a desired iron content in the base fluid. The iron concentration was confirmed using Hach FerroVer Iron Reagent (Catalog Number 854-99). The friction reducing agent was introduced thirty seconds after the addition of the ferrous compound. For Example 3, the friction reducing agent was WFR-3B and was applied at 0.5 gallons per 1000 gallons of base fluid (gpt).

TABLE 6

| Ferrous Content (ppm) | % Friction Reduction |
| --- | --- |
| 0 | 70% |
| 10 | 26% |
| 25 | 25% |
| 50 | 13% |
| 75 | 0% |

In this example, the effect of using a fluid treatment system including at least one material (a) (an iron control agent) and friction reducing agent (b) according to the present invention was evaluated. The same apparatus was used and the same flow conditions were maintained as above with fresh water. The concentration of ferrous iron was held constant at 25 ppm. The material (a), ICP-1000, was applied at various treatment rates and was mixed for 30 seconds prior addition of the ferrous sulfate. For this example, the friction reducing agent was WFR-3B and was applied at 1.0 gpt. As observed in Table 7, performance of the friction reducing agent was significantly improved in the presence of the material (a) and surpassed the performance of the no iron control.

TABLE 7

| ICP-1000 (gpt) | % Friction Reduction |
| --- | --- |
| Control - no iron or ICP-1000 | 64% |
| 0.00 | 44% |
| 0.25 | 59% |
| 0.50 | 68% |
| 0.75 | 68% |
| 1.00 | 68% |

In this example the same flow conditions were observed as above. The base fluid was prepared by adding various inorganic salts to fresh water to simulate well flowback water. The chemical makeup of the water is presented below in Table 8:

TABLE 8

| Ion | ppm |
| --- | --- |
| Na | 4,050 |
| Ca | 1,000 |
| Mg | 500 |
| Cl | 9,400 |
| $HCO_3$ | 145 |

In this example, an iron control agent was added and the concentration of ferrous iron was held constant at 25 ppm. The iron control agent, ICP-1000, was applied at various treatment rates and was mixed for 30 seconds prior addition of the ferrous sulfate. For this example, the friction reducing agent was WFR-3B and was applied at 0.5 gpt. As observed in Table 9, performance of the friction reducing agent is significantly improved in the presence of the iron control agent and performed almost equivalently to the no iron-containing control.

TABLE 9

| ICP-1000 (gpt) | % Friction Reduction |
| --- | --- |
| Control - no iron or ICP-1000 | 63% |
| 0.00 | 43% |
| 0.25 | 59% |
| 0.50 | 60% |
| 1.00 | 61% |

In this example the same flow conditions were observed as above. The base fluid was prepared by adding 10,200 ppm of sodium chloride to fresh water to produce a high TDS brine. In this example an iron control agent was added and the concentration of ferrous iron was held constant at 25 ppm. The iron control agent, ICP-1000, was applied at various treatment rates and was mixed for 30 seconds prior addition of the ferrous sulfate. For this example, the friction reducing agent was WFR-3B and was applied at 0.5 gpt. As observed in Table 10, performance of the friction reducing agent was significantly improved in the presence of the iron control agent and performed almost equivalently to the no iron-containing control.

TABLE 10

| ICP-1000 (gpt) | % Friction Reduction |
| --- | --- |
| Control - no iron or ICP-1000 | 69% |
| 0.00 | 53% |
| 0.25 | 59% |
| 0.50 | 62% |
| 1.00 | 70% |

In this example the same flow conditions were observed as above with fresh water, an iron control agent was added and the concentration of ferrous iron was held constant at 25 ppm. For comparison, the performance of ICP-1000 was evaluated against citric acid and EDTA which are commonly used in fracturing fluids as iron control agents. The iron control agent was applied at various treatment rates and was mixed for 30 seconds prior addition of the ferrous sulfate. For this example, the friction reducing agent was WFR-3B and was applied at 1.0 gpt. As observed in Table 11, the performance of the commonly used iron control agents in some instances impaired the performance of the friction reducing agent. EDTA had a deleterious effect on the performance of the friction reducing agent over the entire dosage range. In contrast, at lower levels of treatment citric acid combined with iron to cause significant deterioration to the performance of the friction reducing agent. It is significant to note that ICP-1000 improved the performance of the friction reducing agent over the entire treatment range.

TABLE 11

| Iron Control Additive | Friction Reduction (%) | | |
|---|---|---|---|
| (gpt) | ICP-1000 | Citric Acid | EDTA |
| 0.00 | 44% | 44% | 44% |
| 0.15 | — | 13% | — |
| 0.25 | 59% | 27% | 43% |
| 0.35 | — | 48% | — |
| 0.50 | 68% | 68% | 35% |
| 0.75 | 68% | 68% | 33% |

Example 4

In this example the same flow conditions were observed as in Example 3. As in Table 8, the base fluid was prepared by adding various inorganic salts to fresh water to simulate well flowback water. In this example the concentration of ferrous iron was held constant at 25 ppm. The iron control agent, ICP-1000 and/or the KR-DP0510, a phosphonate-ester/acrylic acid copolymer scale inhibitor blend was applied and was mixed for 30 seconds prior addition of the ferrous sulfate. For this example, the friction reducing agent was WFR-3B and was applied at 0.5 gpt. As observed in Table 12, the performance of the friction reducing agent with either treatment was significantly improved over the untreated test condition. Surprisingly, the performance of the friction reducing agent also was improved in the presence of the scale inhibitor at the same application dosage of the iron control agent.

TABLE 12

| ICP-1000 (gpt) | KR-DP0520 (gpt) | % Friction Reduction |
|---|---|---|
| 0.00 | 0.00 | 43% |
| 0.50 | 0.00 | 60% |
| 0.50 | 2.00 | 69% |

It will be appreciated by those skilled in the art that changes could be made to the embodiments described above without departing from the broad inventive concept thereof. It is understood, therefore, that this invention is not limited to the particular embodiments disclosed, but it is intended to cover modifications which are within the spirit and scope of the invention, as defined by the appended claims.

The invention claimed is:

1. A fracturing fluid treatment system comprising:
(a) at least one material comprising (1) at least one carboxylic acid functional group and (2) at least one sulfur-containing group selected from the group consisting of sulfonyl functional groups, sulfonate functional groups, and mixtures thereof, wherein the material (a) has a weight average molecular weight ranging from about 500 to about 30,000 grams per mole;
(b) at least one friction reducing agent comprising:
(i) about 5% to about 99% by weight of a water-in-oil emulsion polymer comprising a polyacrylamide comprising one or more repeat units according to Formula I:

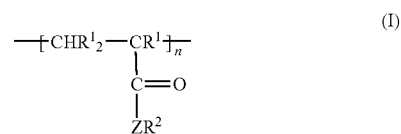

wherein each occurrence of $R^1$ is independently selected from H, methyl and ethyl; n is an integer from 10 to 10,000,000; Z is selected from —O— and —$NR^2$—; and each occurrence of $R^2$ is independently selected from the group consisting of H, $C_1$-$C_{22}$ linear, branched or cyclic alkyl, aryl, alkaryl, aralkyl or alkenyl group, —$R^3$—$NR^2{}_2$, —$R^3$—$N^+R^2{}_3X$, and —$R^3$—$SO_3Y$, wherein $R^2$ is as previously defined; $R^3$ is a divalent linking group selected from the group consisting of $C_1$-$C_{22}$ linear, branched or cyclic alkylene, arylene, alkarylene, aralkylene or alkenylene, poly(ethyleneoxide) and poly(propyleneoxide); Y is H or an alkali metal ion; and X is a halide or methylsulfate, wherein the polyacrylamide has a molecular weight of 1,000,000 to 50,000,000 grams per mole;
(ii) about 0.1% to about 10% by weight of one or more inorganic microparticles;
(iii) about 0.5% to about 90% by weight of a carrier solvent; and
(iv) 0 to about 90% by weight of a fluidizing agent; and
(c) at least one scale control agent, wherein the scale control agent comprises at least one water-soluble polycarboxylate comprising a polymer derived from at least one carboxylic acid functional, ethylenically unsaturated material selected from the group consisting of acrylic acid, methacrylic acid, vinyl acetic acid, allyl acetic acid, fumaric acid, phosphinocarboxylic acid, maleic acid or anhydride, itaconic acid, α-halo acrylic acid, β-carboxyethyl acrylic acid and mixtures thereof.

2. The fracturing fluid treatment system according to claim 1, wherein the at least one material (a) is a reaction product or salt thereof, wherein the reaction product is prepared from reactants comprising:
(a) at least one ethylenically unsaturated, carboxylic acid functional material or anhydride thereof; and
(b) at least one ethylenically unsaturated, sulfur-containing material, wherein the ethylenically unsaturated sulfur-containing material comprises at least one sulfur-containing group selected from the group consisting of sulfonyl functional groups, sulfonate functional groups and mixtures thereof.

3. The fracturing fluid treatment system according to claim 2, wherein the at least one ethylenically unsaturated, carboxylic acid functional material or anhydride thereof comprises about 10 to about 90 weight percent of the reactants, on a basis of total weight of the reactants.

4. The fracturing fluid treatment system according to claim 2, wherein the weight ratio of ethylenically unsaturated, carboxylic acid functional material or anhydride thereof to ethylenically unsaturated, sulfonyl functional or sulfonate functional material ranges from about 1:20 to about 20:1.

5. The fracturing fluid treatment system according to claim 2, wherein the ethylenically unsaturated, carboxylic acid functional material or salt thereof has acrylic or vinyl functionality.

6. The fracturing fluid treatment system according to claim 2, wherein the ethylenically unsaturated, carboxylic acid functional material is selected from the group consisting of acrylic acid, methacrylic acid, α-halo acrylic acid, maleic acid, itaconic acid, vinyl acetic acid, allyl acetic acid, fumaric acid, β-carboxyethyl acrylic acid, salts thereof, and mixtures thereof.

7. The fracturing fluid treatment system according to claim 2, wherein the ethylenically unsaturated, carboxylic acid functional anhydride is maleic anhydride.

8. The fracturing fluid treatment system according to claim 2, wherein the ethylenically unsaturated, sulfur-containing material has vinyl functionality, acrylic functionality, acrylamido functionality, acrylamido alkyl functionality or acrylamido aryl functionality.

9. The fracturing fluid treatment system according to claim 2, wherein the ethylenically unsaturated, sulfur-containing material is selected from the group consisting of 2-acrylamido-2-methylpropyl sulfonic acid; allyl-2-hydroxypropyl sulfonic acid ether; allyl-2-hydroxypropyl sulfonate ether; sulfomethylacrylamide; 2-propene-1-sulfonic acid, 2-methyl; 2-methacrylamido-2-methylpropyl sulfonic acid; styrene sulfonic acid; vinyl sulfonic acid; sulfoalkyl acrylate; sulfoalkyl methacrylate; sulfoalkyl acrylamide; allyl sulfonic acid; methallyl sulfonic acid; para methallyloxy benzene sulfonic acid; allyl-2-hydroxypropyl sulfonic acid; 3-methacrylamido-2-hydroxypropyl sulfonic acid; sulfonic acid acrylate; sulfonated phenolmethacrylic ether; salts thereof and mixtures thereof.

10. The fracturing fluid treatment system according to claim 2, wherein the reaction product (a) is prepared from acrylic acid and 2-acrylamido-2-methylpropyl sulfonic acid.

11. The fracturing fluid treatment system according to claim 10, wherein the reaction product (a) is prepared from about 25 to about 95 mole percent of acrylic acid and about 5 to about 75 mole percent of 2-acrylamido-2-methylpropyl sulfonic acid.

12. The fracturing fluid treatment system according to claim 2, wherein the at least one ethylenically unsaturated, sulfur-containing material comprises about 5 to about 95 weight percent of the reactants, on a basis of total weight of the reactants.

13. The fracturing fluid treatment system according to claim 2, wherein the reaction product (a) comprises (i) at least one sulfonated styrene moiety:

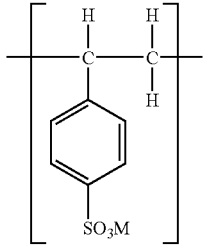

and (ii) at least one moiety derived from maleic anhydride:

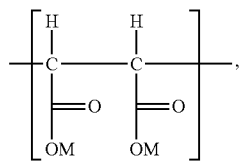

wherein each M is independently selected from $NH_4$, H, Na, or K.

14. The fracturing fluid treatment system according to claim 2, wherein the reactants further comprise at least one ethylenically unsaturated material that is different from (a) the at least one ethylenically unsaturated, carboxylic acid functional material or anhydride thereof; and (b) the at least one ethylenically unsaturated, sulfur-containing material.

15. The fracturing fluid treatment system according to claim 2, wherein the reactants further comprise at least one monomer selected from the group consisting of acrylamides, vinyl esters, vinyl acetates and mixtures thereof, the monomer being different from the ethylenically unsaturated, carboxylic acid functional material or anhydride thereof and the at least one ethylenically unsaturated, sulfur-containing material.

16. The fracturing fluid treatment system according to claim 15, wherein the monomer is selected from the group consisting of tert-butyl acrylamide; 2-propenoic acid, 2-methyl-, methyl ester; and mixtures thereof.

17. The fracturing fluid treatment system according to claim 14, wherein the reactants comprise up to about 60 weight percent of the at least one ethylenically unsaturated material, on a basis of total weight of the reactants.

18. The fracturing fluid treatment system according to claim 2, wherein the reactants further comprise at least one ethylenically unsaturated polyalkylene oxide.

19. The fracturing fluid treatment system according to claim 18, wherein the ethylenically unsaturated polyalkylene oxide is selected from the group consisting of allyl polyethylene glycol, methallyl polyethylene glycol, polyethylene glycol acrylate, polyethylene glycol methacrylate, methoxy allyl polyethylene oxide, alkoxyallyl polyethylene oxide, allyl polypropylene glycol, methallyl polypropylene glycol, polypropylene glycol acrylate, polypropylene glycol methacrylate, methoxy allyl polypropylene oxide, alkoxyallyl polypropylene oxide, and mixtures thereof.

20. The fracturing fluid treatment system according to claim 1, wherein the polyacrylamide is a water-in-oil emulsion polymer comprising a polymer or copolymer containing repeat units from an acrylamide monomer.

21. The fracturing fluid treatment system according to claim 1, wherein the scale control agent further comprises at least one water-soluble phosphonate selected from the group consisting of hydroxyphosphono acetic acid (HPA), diethylenetriamine-penta(methylenephosphonic acid), hexamethylenediaminetetra(methylenephosphonic acid), 2-phosphono-1,2,4-tricarboxybutane, amino tri(methylene phosphonic acid), hydroxyethylidene diphosphonic acid, phosphonosuccinic acid, benzene phosphonic acid, 2-aminoethyl phosphonic acid, polyamino phosphonates, and salts thereof where they exist.

22. The fracturing fluid treatment system according to claim 1, wherein the scale control agent further comprises at least one water-soluble phosphonate polyether selected from the group consisting of polyamino methylene phosphonates.

23. The fracturing fluid treatment system according to claim 1, wherein the scale control agent further comprises at least one water-soluble phosphate selected from the group consisting of orthophosphate; condensed phosphates; phosphate esters; organophosphate esters and mixtures thereof.

24. The fracturing fluid treatment system according to claim 1, wherein the scale control agent further comprises at least one water-soluble metal salt selected from the group consisting of water-soluble salts of zinc, molybdenum, chromate, sodium silicate and mixtures thereof.

25. The fracturing fluid treatment system according to claim 1, wherein the scale control agent further comprises at least one water-soluble sulfonate comprising a polymer derived from at least one monomer selected from the group consisting of 2-acrylamido-2-methylpropylsulfonic acid, 2-methacrylamido-2-methylpropylsulfonic acid, styrene sulfonic acid, vinyl sulfonic acid, sulfo alkyl acrylate or methacrylate, allyl or methallyl sulfonic acid, sulfonic acid acrylate, 3-methacrylamido-2-hydroxy propyl sulfonic acid, their salts and mixtures thereof.

26. The fracturing fluid treatment system according to claim 1, wherein the scale control agent comprises at least one water-soluble phosphonate and at least one water-soluble polycarboxylate.

27. The fracturing fluid treatment system according to claim 26, wherein the scale control agent comprises 2-phosphono-1,2,4-tricarboxybutane, polyacrylic acid and a reaction product prepared from acrylic acid and 2-acrylamido-2-methylpropyl sulfonic acid.

28. The fracturing fluid treatment system according to claim 1, wherein the scale control agent comprises at least one water-soluble phosphonate, at least one water-soluble polycarboxylate and at least one material (a1) comprising (1) at least one carboxylic acid functional group and (2) at least one sulfur-containing group selected from the group consisting of sulfonyl functional groups, sulfonate functional groups and mixtures thereof, wherein the material (a1) can be the same or different from the material (a).

29. The fracturing fluid treatment system according to claim 1, further comprising at least one surfactant.

30. The fracturing fluid treatment system according to claim 29, wherein the at least one surfactant is selected from the group consisting of alkanolamides, polyoxyethylene derivatives of sorbitan esters, sorbitan monooleate, sorbitan monostearate, $C_6$-$C_{22}$ linear or branched alkyl ethoxylates having 1 to 30 oxyethylene units, $C_6$-$C_{22}$ linear or branched alkyl propoxylates having 1 to 30 oxypropylene units, $C_6$-$C_{22}$ linear or branched alkyl ethoxylates/propoxylates having 1 to 30 combined oxyethylene and propoxylate units, alkylaryl ethoxylates containing a $C_6$-$C_{22}$ aryl group and having 1 to 30 oxyethylene units, hexadecyl sodium phthalate, cetyl sodium phthalate, stearyl sodium phthalate, ethylene oxide condensates of fatty acid amides, alpha olefin sulfonates, ether sulfates, ether sulfonates, alkoxylated alcohol surfactants, sulfosuccinates, and mixtures thereof.

31. The fracturing fluid treatment system according to claim 1, further comprising at least one biocide.

32. The fracturing fluid treatment system according to claim 1, wherein the fluid treatment system further comprises water, and the at least one material (a), at least one friction reducing agent (b), and at least one scale control agent (c) are added to the water sequentially or concurrently.

33. An aqueous composition comprising water and the fracturing fluid treatment system according to claim 1.

34. The aqueous composition according to claim 33, wherein the water comprises metal ions.

35. The aqueous composition according to claim 34, wherein the metal ions comprise ferrous ions.

36. The aqueous composition according to claim 34, wherein the metal ions comprise sodium ions.

37. A fracturing fluid for treating a subterranean formation penetrated by a well bore, the fracturing fluid comprising water and the fracturing fluid treatment system according to claim 1.

38. The fracturing fluid according to claim 37, further comprising at least one acid.

39. A method of treating a subterranean formation penetrated by a well bore comprising: contacting the subterranean formation with the fracturing fluid of claim 37.

40. A method of inhibiting formation of metal oxides in an aqueous composition comprising metal ions, comprising:
mixing an aqueous composition comprising metal ions with the fracturing fluid treatment system according to claim 1.

41. The method according to claim 40, wherein the metal ions are ferrous ions and the metal oxide is iron oxide.

42. The fracturing fluid treatment system according to claim 1, wherein the material (a) is prepared from acrylic acid and 2-acrylamido-2-methylpropyl sulfonic acid, the scale control agent (c) is polyacrylic acid, and the system further comprises diethylenetriamine-penta(methylenephosphonic acid) and 2-phosphono-1,2,4-tricarboxybutane.

43. A method of inhibiting precipitation of metal oxides in an aqueous composition comprising metal ions, comprising:
mixing an aqueous composition comprising metal ions with the fracturing fluid treatment system according to claim 1.

44. A fracturing composition comprising:
(a) at least one material comprising (1) at least one carboxylic acid functional group and (2) at least one sulfur-containing group selected from the group consisting of sulfonyl functional groups, sulfonate functional groups, and mixtures thereof, wherein the material (a) has a weight average molecular weight ranging from about 500 to about 30,000 grams per mole;
(b) at least one friction reducing agent comprising:
(i) about 5% to about 99% by weight of a water-in-oil emulsion polymer comprising a polyacrylamide comprising one or more repeat units according to Formula I:

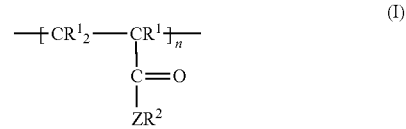

wherein each occurrence of $R^1$ is independently selected from H, methyl and ethyl; n is an integer from 10 to 10,000,000; Z is selected from —O— and —$NR^2$—; and each occurrence of $R^2$ is independently selected from the group consisting of H, $C_1$-$C_{22}$ linear, branched or cyclic alkyl, aryl, alkaryl, aralkyl or alkenyl group, —$R^3$—$NR^2{}_2$, —$R^3$—$N^+R^2{}_3X$, and —$R^3$—$SO_3Y$, wherein $R^2$ is as previously defined; $R^3$ is a divalent linking group selected from the group consisting of $C_1$-$C_{22}$ linear, branched or cyclic alkylene, arylene, alkarylene, aralkylene or alkenylene, poly(ethyleneoxide) and poly(propyleneoxide); Y is H or an alkali metal ion; and X is a halide or methylsulfate, wherein the polyacrylamide has a molecular weight of 1,000,000 to 50,000,000 grams per mole;
(ii) about 0.1% to about 10% by weight of one or more inorganic microparticles;
(iii) about 0.5% to about 90% by weight of a carrier solvent; and
(iv) 0 to about 90% by weight of a fluidizing agent; and
(c) at least one scale control agent, wherein the scale control agent comprises at least one water-soluble polycarboxylate comprising a polymer derived from at least one carboxylic acid functional, ethylenically unsaturated material selected from the group consisting of acrylic acid, methacrylic acid, vinyl acetic acid, allyl acetic acid, fumaric acid, phosphinocarboxylic acid, maleic acid or anhydride, itaconic acid, α-halo acrylic acid, β-carboxyethyl acrylic acid and mixtures thereof.

45. The fracturing composition according to claim 44, wherein the material (a) is prepared from acrylic acid and 2-acrylamido-2-methylpropyl sulfonic acid, the scale control agent (c) is polyacrylic acid, and the composition further comprises diethylenetriamine-penta(methylenephosphonic acid) and 2-phosphono-1,2,4-tricarboxybutane.

46. A method of inhibiting formation of metal oxides in an aqueous composition comprising at least 20 milligrams of metal ions per liter of aqueous composition, comprising:
  mixing an aqueous composition comprising metal ions with a fracturing fluid treatment system comprising:
  (a) at least one material comprising (1) at least one carboxylic acid functional group and (2) at least one sulfur-containing group selected from the group consisting of sulfonyl functional groups, sulfonate functional groups and mixtures thereof, wherein the material (a) has a weight average molecular weight ranging from about 500 to about 30,000 grams per mole;
  (b) at least one friction reducing agent comprising:
    (i) about 5% to about 99% by weight of a water-in-oil emulsion polymer comprising a polyacrylamide comprising one or more repeat units according to Formula I:

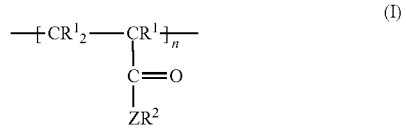

wherein each occurrence of $R^1$ is independently selected from H, methyl and ethyl; n is an integer from 10 to 10,000,000; Z is selected from —O— and —$NR^2$—; and each occurrence of $R^2$ is independently selected from the group consisting of H, $C_1$-$C_{22}$ linear, branched or cyclic alkyl, aryl, alkaryl, aralkyl or alkenyl group, —$R^3$—$NR^2_2$, —$R^3$—$N^+R^2_3X$, and —$R^3$—$SO_3Y$, wherein $R^2$ is as previously defined; $R^3$ is a divalent linking group selected from the group consisting of $C_1$-$C_{22}$ linear, branched or cyclic alkylene, arylene, alkarylene, aralkylene or alkenylene, poly(ethyleneoxide) and poly(propyleneoxide); Y is H or an alkali metal ion; and X is a halide or methylsulfate, wherein the polyacrylamide has a molecular weight of 1,000,000 to 50,000,000 grams per mole;
    (ii) about 0.1% to about 10% by weight of one or more inorganic microparticles;
    (iii) about 0.5% to about 90% by weight of a carrier solvent; and
    (iv) 0 to about 90% by weight of a fluidizing agent; and
  (c) at least one scale control agent, wherein the scale control agent comprises at least one water-soluble polycarboxylate comprising a polymer derived from at least one carboxylic acid functional, ethylenically unsaturated material selected from the group consisting of acrylic acid, methacrylic acid, vinyl acetic acid, allyl acetic acid, fumaric acid, phosphinocarboxylic acid, maleic acid or anhydride, itaconic acid, α-halo acrylic acid, β-carboxyethyl acrylic acid and mixtures thereof.

47. The method according to claim 46, wherein the metal ions are ferrous ions and the metal oxide is iron oxide.

48. The method according to claim 46, wherein the material (a) is prepared from acrylic acid and 2-acrylamido-2-methylpropyl sulfonic acid, the scale control agent (c) is polyacrylic acid, and the system further comprises diethylenetriamine-penta(methylenephosphonic acid) and 2-phosphono-1,2,4-tricarboxybutane.

49. A method of inhibiting precipitation of metal oxides in an aqueous composition comprising at least 20 milligrams of metal ions per liter of aqueous composition, comprising:
  mixing an aqueous composition comprising metal ions with a fracturing fluid treatment system comprising:
  (a) at least one material comprising (1) at least one carboxylic acid functional group and (2) at least one sulfur-containing group selected from the group consisting of sulfonyl functional groups, sulfonate functional groups and mixtures thereof, wherein the material (a) has a weight average molecular weight ranging from about 500 to about 30,000 grams per mole;
  (b) at least one friction reducing agent comprising:
    (i) about 5% to about 99% by weight of a water-in-oil emulsion polymer comprising a polyacrylamide comprising one or more repeat units according to Formula I:

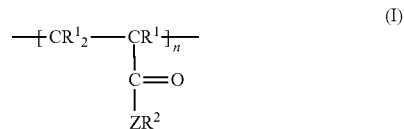

wherein each occurrence of $R^1$ is independently selected from H, methyl and ethyl; n is an integer from 10 to 10,000,000; Z is selected from —O— and —$NR^2$—; and each occurrence of $R^2$ is independently selected from the group consisting of H, $C_1$-$C_{22}$ linear, branched or cyclic alkyl, aryl, alkaryl, aralkyl or alkenyl group, —$R^3$—$NR^2_2$, —$R^3$—$N^+R^2_3X$, and —$R^3$—$SO_3Y$, wherein $R^2$ is as previously defined; $R^3$ is a divalent linking group selected from the group consisting of $C_1$-$C_{22}$ linear, branched or cyclic alkylene, arylene, alkarylene, aralkylene or alkenylene, poly(ethyleneoxide) and poly(propyleneoxide); Y is H or an alkali metal ion; and X is a halide or methylsulfate, wherein the polyacrylamide has a molecular weight of 1,000,000 to 50,000,000 grams per mole;
    (ii) about 0.1% to about 10% by weight of one or more inorganic microparticles;
    (iii) about 0.5% to about 90% by weight of a carrier solvent; and
    (iv) 0 to about 90% by weight of a fluidizing agent; and
  (c) at least one scale control agent, wherein the scale control agent comprises at least one water-soluble polycarboxylate comprising a polymer derived from at least one carboxylic acid functional, ethylenically unsaturated material selected from the group consisting of acrylic acid, methacrylic acid, vinyl acetic acid, allyl acetic acid, fumaric acid, phosphinocarboxylic acid, maleic acid or anhydride, itaconic acid, α-halo acrylic acid, β-carboxyethyl acrylic acid and mixtures thereof.

50. The method according to claim 49, wherein the material (a) is prepared from acrylic acid and 2-acrylamido-2-methylpropyl sulfonic acid, the scale control agent (c) is polyacrylic acid, and the system further comprises diethylenetriamine-penta(methylenephosphonic acid) and 2-phosphono-1,2,4-tricarboxybutane.

51. A method of improving friction reduction of a friction reducing agent in a hydraulic fracturing fluid comprising at least about 10 ppm ferrous iron, comprising:
mixing an aqueous composition comprising at least about 10 ppm ferrous iron with a fracturing fluid treatment system comprising:
(a) at least one material comprising (1) at least one carboxylic acid functional group and (2) at least one sulfur-containing group selected from the group consisting of sulfonyl functional groups, sulfonate functional groups and mixtures thereof, wherein the material (a) has a weight average molecular weight ranging from about 500 to about 30,000 grams per mole;
(b) at least one friction reducing agent comprising:
about 5% to about 99% by weight of a water-in-oil emulsion polymer comprising a polyacrylamide comprising one or more repeat units according to Formula I:

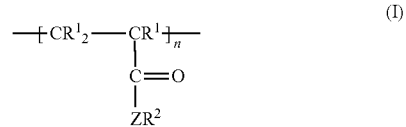

(I)

wherein each occurrence of $R^1$ is independently selected from H, methyl and ethyl; n is an integer from 10 to 10,000,000; Z is selected from —O— and —$NR^2$—; and each occurrence of $R^2$ is independently selected from the group consisting of H, $C_1$-$C_{22}$ linear, branched or cyclic alkyl, aryl, alkaryl, aralkyl or alkenyl group, —$R^3$—$NR^2{}_2$, —$R^3$—$N^+R^2{}_3X$, and —$R^3$—$SO_3Y$, wherein $R^2$ is as previously defined; $R^3$ is a divalent linking group selected from the group consisting of $C_1$-$C_{22}$ linear, branched or cyclic alkylene, arylene, alkarylene, aralkylene or alkenylene, poly(ethyleneoxide) and poly(propyleneoxide); Y is H or an alkali metal ion; and X is a halide or methylsulfate, wherein the polyacrylamide has a molecular weight of 1,000,000 to 50,000,000 grams per mole;
(ii) about 0.1% to about 10% by weight of one or more inorganic microparticles;
(iii) about 0.5% to about 90% by weight of a carrier solvent; and
(iv) 0 to about 90% by weight of a fluidizing agent; and
(c) at least one scale control agent, wherein the scale control agent comprises at least one water-soluble polycarboxylate comprising a polymer derived from at least one carboxylic acid functional, ethylenically unsaturated material selected from the group consisting of acrylic acid, methacrylic acid, vinyl acetic acid, allyl acetic acid, fumaric acid, phosphinocarboxylic acid, maleic acid or anhydride, itaconic acid, α-halo acrylic acid, β-carboxyethyl acrylic acid and mixtures thereof.

52. The method according to claim 51, wherein the material (a) is prepared from acrylic acid and 2-acrylamido-2-methylpropyl sulfonic acid, the scale control agent (c) is polyacrylic acid, and the system further comprises diethylenetriamine-penta(methylenephosphonic acid) and 2-phosphono-1,2,4-tricarboxybutane.

53. A method of improving friction reduction of a friction reducing agent in a hydraulic fracturing fluid comprising at least about 10 ppm ferrous iron, comprising:
mixing an aqueous composition comprising at least about 10 ppm ferrous iron with a fracturing fluid treatment system consisting of:
(a) a reaction product (a) prepared from reactants consisting of 20 to 80 wt % acrylic acid and 10 to 60 wt % 2-acrylamido-2-methylpropyl sulfonic acid, the reaction product (a) having a weight average molecular weight ranging from about 500 to about 30,000 grams per mole; and
(b) at least one friction reducing agent comprising:
(i) about 5% to about 99% by weight of a water-in-oil emulsion polymer comprising a polyacrylamide comprising one or more repeat units according to Formula I:

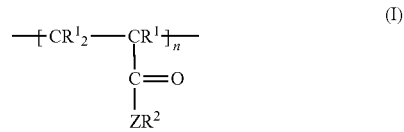

(I)

wherein each occurrence of $R^1$ is independently selected from H, methyl and ethyl; n is an integer from 10 to 10,000,000; Z is selected from —O— and —$NR^2$—; and each occurrence of $R^2$ is independently selected from the group consisting of H, $C_1$-$C_{22}$ linear, branched or cyclic alkyl, aryl, alkaryl, aralkyl or alkenyl group, $R^3$—$NR^2{}_2$, —$R^3$—$N^+R^2{}_3X$, and —$R^3$—$SO_3Y$, wherein $R^2$ is as previously defined; $R^3$ is a divalent linking group selected from the group consisting of $C_1$-$C_{22}$ linear, branched or cyclic alkylene, arylene, alkarylene, aralkylene or alkenylene, poly(ethyleneoxide) and poly(propyleneoxide); Y is H or an alkali metal ion; and X is a halide or methylsulfate, wherein the polyacrylamide has a molecular weight of 1,000,000 to 50,000,000 grams per mole;
(ii) about 0.1% to about 10% by weight of one or more inorganic microparticles;
(iii) about 0.5% to about 90% by weight of a carrier solvent; and
(iv) 0 to about 90% by weight of a fluidizing agent; and
(c) at least one scale control agent, wherein the scale control agent consisting of 2-phosphono-1,2,4-tricarboxybutane, polyacrylic acid and a reaction product prepared from acrylic acid and 2-acrylamido-2-methylpropyl sulfonic acid.

54. The method according to claim 53, wherein the material (a) is prepared from acrylic acid and 2-acrylamido-2-methylpropyl sulfonic acid, the scale control agent (c) is polyacrylic acid, and the system further comprises diethylenetriamine-penta(methylenephosphonic acid) and 2-phosphono-1,2,4-tricarboxybutane.

* * * * *

UNITED STATES PATENT AND TRADEMARK OFFICE
CERTIFICATE OF CORRECTION

PATENT NO.         : 8,940,667 B2
APPLICATION NO.    : 12/794495
DATED              : January 27, 2015
INVENTOR(S)        : Paul Rey et al.

Page 1 of 2

It is certified that error appears in the above-identified patent and that said Letters Patent is hereby corrected as shown below:

On the Title Page

Page 2, Column 2, OTHER PUBLICATIONS, Line 12, delete ""Viscoelastic Viscoelastic" and insert -- "Viscoelastic --

Page 2, Column 2, OTHER PUBLICATIONS, Line 30, delete "Shlumberger" and insert -- Schlumberger --

Page 2, Column 2, OTHER PUBLICATIONS, Line 44, delete ""GammaFRacTM" and insert -- "GammaFRac™ --

In the Claims

Column 30, Lines 8-13, Claim 1,

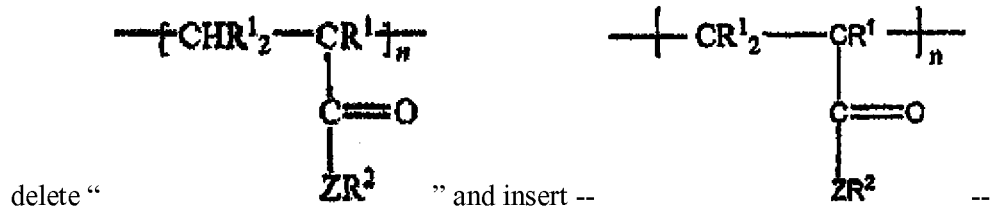

Column 31, Lines 59-65, Claim 13,

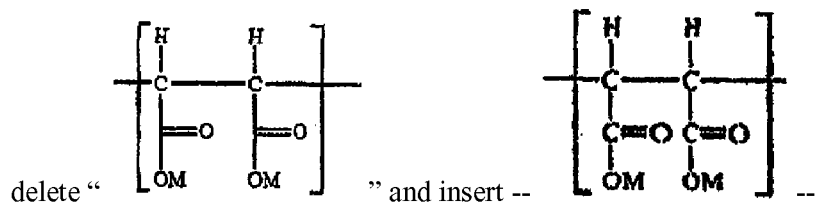

Signed and Sealed this
Twenty-ninth Day of September, 2015

Michelle K. Lee
*Director of the United States Patent and Trademark Office*

CERTIFICATE OF CORRECTION (continued)
U.S. Pat. No. 8,940,667 B2

Column 32, Lines 20-21, Claim 16, delete "2-methyl-," and insert -- 2-methyl, --

Column 37, Line 17, Claim 51, delete "about" and insert -- (i) about --

Column 38, Line 35, Claim 53, delete "R3-" and insert -- –R3– --